(12) United States Patent
Abe

(10) Patent No.: US 7,941,571 B2
(45) Date of Patent: May 10, 2011

(54) PERIPHERAL DEVICE CONTROL SYSTEM

(75) Inventor: Koichi Abe, Yokohama (JP)

(73) Assignee: Canon Kabushiki Kaisha (JP)

( * ) Notice: Subject to any disclaimer, the term of this patent is extended or adjusted under 35 U.S.C. 154(b) by 225 days.

(21) Appl. No.: 12/139,437

(22) Filed: Jun. 13, 2008

(65) Prior Publication Data

US 2008/0313360 A1     Dec. 18, 2008

(30) Foreign Application Priority Data

Jun. 15, 2007   (JP) ................. 2007-159496

(51) Int. Cl.
*G06F 3/00* (2006.01)
*G06F 13/00* (2006.01)
(52) U.S. Cl. .............. 710/15; 710/8; 710/33; 710/36
(58) Field of Classification Search .............. None
See application file for complete search history.

(56) References Cited

U.S. PATENT DOCUMENTS

2002/0188504 A1* 12/2002 Whale ............... 705/14

FOREIGN PATENT DOCUMENTS

JP        3841023 B2     8/2006

OTHER PUBLICATIONS

How to Get the Status of a Printer and a Print Job, Nov. 21, 2006, Microsoft Support, [Online, accessed on Jan. 14, 2011] URL: http://support.microsoft.com/kb/160129.*

* cited by examiner

*Primary Examiner* — Tariq Hafiz
*Assistant Examiner* — Scott Sun
(74) *Attorney, Agent, or Firm* — Rossi, Kimms & McDowell LLP

(57) ABSTRACT

An accurate, highly reliable peripheral device control system is realized by issuing notifications related to a print job having the correct content from a printer driver with accurate timing and in the correct order, and conveying correct information to an application with accurate timing and in the correct order in a peripheral device control system that uses a low-performance printer. In an peripheral device control system composed of an information processing apparatus and a peripheral device, the information processing apparatus acquires peripheral device information related to the peripheral device from the peripheral device, generates job information from the peripheral device information, and notifies the job information. At this time, a notification not yet issued is created based on notified printing and printed page numbers and a current printing page number, and issued.

16 Claims, 35 Drawing Sheets

FIG. 6

| NOTIFICATION TYPE (TIMING) | VALUE SET IN NOTIFICATION ID (funcId) |
|---|---|
| START (Start) | 10000000 |
| PRINTING (Printing) | 10000001 |
| PRINTED (Printed) | 10000002 |
| FINISHED (Finished) | 10000003 |
| CANCELED (Canceled) | 10000004 |

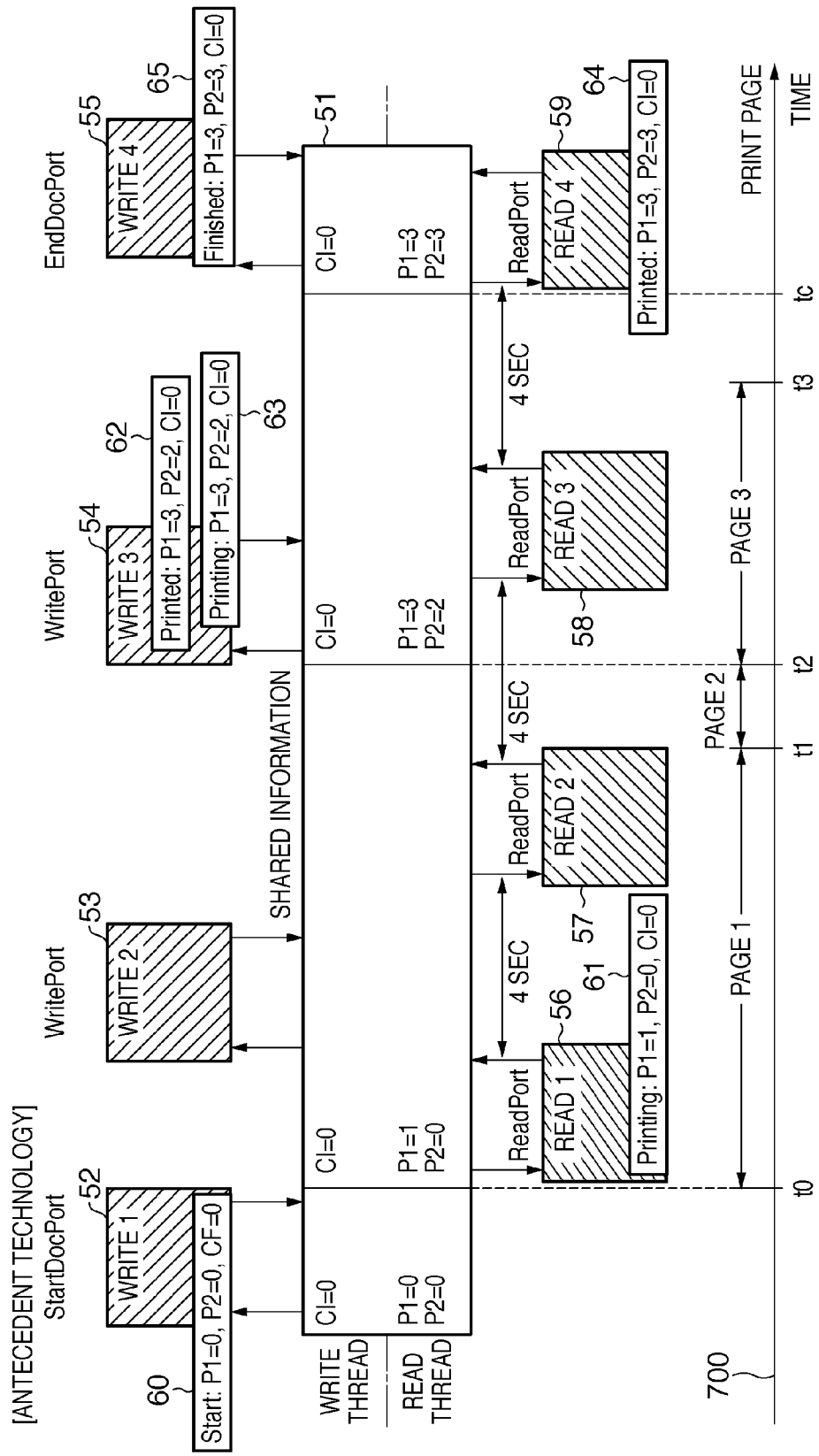

FIG. 8

[ANTECEDENT TECHNOLOGY]

[JobInfo:60] Ver:100, size:2144, funcId:10000000, jobId:4, commMode:2, printer:ABC Kmmn, user:Koichi, document:PhotoAlbum, pagePrinting:0, pagePrinted:0, canceled:0, failedPrint:0, extendedInfo:NULL

[JobInfo:61] Ver:100, size:2144, funcId:10000001, jobId:4, commMode:2, printer:ABC Kmmn, user:Koichi, document:PhotoAlbum, pagePrinting:1, pagePrinted:0, canceled:0, failedPrint:0, extendedInfo:NULL

[JobInfo:62] Ver:100, size:2144, funcId:10000002, jobId:4, commMode:2, printer:ABC Kmmn, user:Koichi, document:PhotoAlbum, pagePrinting:3, pagePrinted:2, canceled:0, failedPrint:0, extendedInfo:NULL

[JobInfo:63] Ver:100, size:2144, funcId:10000001, jobId:4, commMode:2, printer:ABC Kmmn, user:Koichi, document:PhotoAlbum, pagePrinting:3, pagePrinted:2, canceled:0, failedPrint:0, extendedInfo:NULL

[JobInfo:64] Ver:100, size:2144, funcId:10000002, jobId:4, commMode:2, printer:ABC Kmmn, user:Koichi, document:PhotoAlbum, pagePrinting:3, pagePrinted:3, canceled:0, failedPrint:0, extendedInfo:NULL

[JobInfo:65] Ver:100, size:2144, funcId:10000003, jobId:4, commMode:2, printer:ABC Kmmn, user:Koichi, document:PhotoAlbum, pagePrinting:3, pagePrinted:3, canceled:0, failedPrint:0, extendedInfo:NULL

FIG. 10

[ANTECEDENT TECHNOLOGY]

[JobInfo:60] Ver:100, size:2144, funcId:10000000, jobId:4, commMode:2, printer:ABC Kmmn, user:Koichi, document:PhotoAlbum, pagePrinting:0, pagePrinted:0, canceled:0, failedPrint:0, extendedInfo:NULL

[JobInfo:61] Ver:100, size:2144, funcId:10000001, jobId:4, commMode:2, printer:ABC Kmmn, user:Koichi, document:PhotoAlbum, pagePrinting:1, pagePrinted:0, canceled:0, failedPrint:0, extendedInfo:NULL

[JobInfo:66] Ver:100, size:2144, funcId:10000000, jobId:5, commMode:2, printer:ABC Kmmn, user:Koichi, document:PhotoAlbum, pagePrinting:3, pagePrinted:2, canceled:1, failedPrint:0, extendedInfo:NULL

[JobInfo:62] Ver:100, size:2144, funcId:10000002, jobId:4, commMode:2, printer:ABC Kmmn, user:Koichi, document:PhotoAlbum, pagePrinting:3, pagePrinted:2, canceled:1, failedPrint:0, extendedInfo:NULL

[JobInfo:63] Ver:100, size:2144, funcId:10000001, jobId:4, commMode:2, printer:ABC Kmmn, user:Koichi, document:PhotoAlbum, pagePrinting:3, pagePrinted:2, canceled:1, failedPrint:0, extendedInfo:NULL

[JobInfo:65] Ver:100, size:2144, funcId:10000003, jobId:4, commMode:2, printer:ABC Kmmn, user:Koichi, document:PhotoAlbum, pagePrinting:3, pagePrinted:2, canceled:1, failedPrint:0, extendedInfo:NULL

FIG. 12

[JobInfo:70] Ver:100, size:2144, funcId:10000000, jobId:4, commMode:2, printer:ABC Kmmn, user:Koichi, document:PhotoAlbum, pagePrinting:0, pagePrinted:0, canceled:0, failedPrint:0, extendedInfo:NULL ~70

[JobInfo:71] Ver:100, size:2144, funcId:10000001, jobId:4, commMode:2, printer:ABC Kmmn, user:Koichi, document:PhotoAlbum, pagePrinting:1, pagePrinted:0, canceled:0, failedPrint:0, extendedInfo:NULL ~71

[JobInfo:72] Ver:100, size:2144, funcId:10000002, jobId:4, commMode:2, printer:ABC Kmmn, user:Koichi, document:PhotoAlbum, pagePrinting:2, pagePrinted:1, canceled:0, failedPrint:0, extendedInfo:NULL ~72

[JobInfo:73] Ver:100, size:2144, funcId:10000001, jobId:4, commMode:2, printer:ABC Kmmn, user:Koichi, document:PhotoAlbum, pagePrinting:2, pagePrinted:1, canceled:0, failedPrint:0, extendedInfo:NULL ~73

[JobInfo:74] Ver:100, size:2144, funcId:10000002, jobId:4, commMode:2, printer:ABC Kmmn, user:Koichi, document:PhotoAlbum, pagePrinting:3, pagePrinted:2, canceled:0, failedPrint:0, extendedInfo:NULL ~74

[JobInfo:75] Ver:100, size:2144, funcId:10000001, jobId:4, commMode:2, printer:ABC Kmmn, user:Koichi, document:PhotoAlbum, pagePrinting:3, pagePrinted:2, canceled:0, failedPrint:0, extendedInfo:NULL ~75

[JobInfo:76] Ver:100, size:2144, funcId:10000002, jobId:4, commMode:2, printer:ABC Kmmn, user:Koichi, document:PhotoAlbum, pagePrinting:3, pagePrinted:3, canceled:0, failedPrint:0, extendedInfo:NULL ~76

[JobInfo:77] Ver:100, size:2144, funcId:10000003, jobId:4, commMode:2, printer:ABC Kmmn, user:Koichi, document:PhotoAlbum, pagePrinting:3, pagePrinted:3, canceled:0, failedPrint:0, extendedInfo:NULL ~77

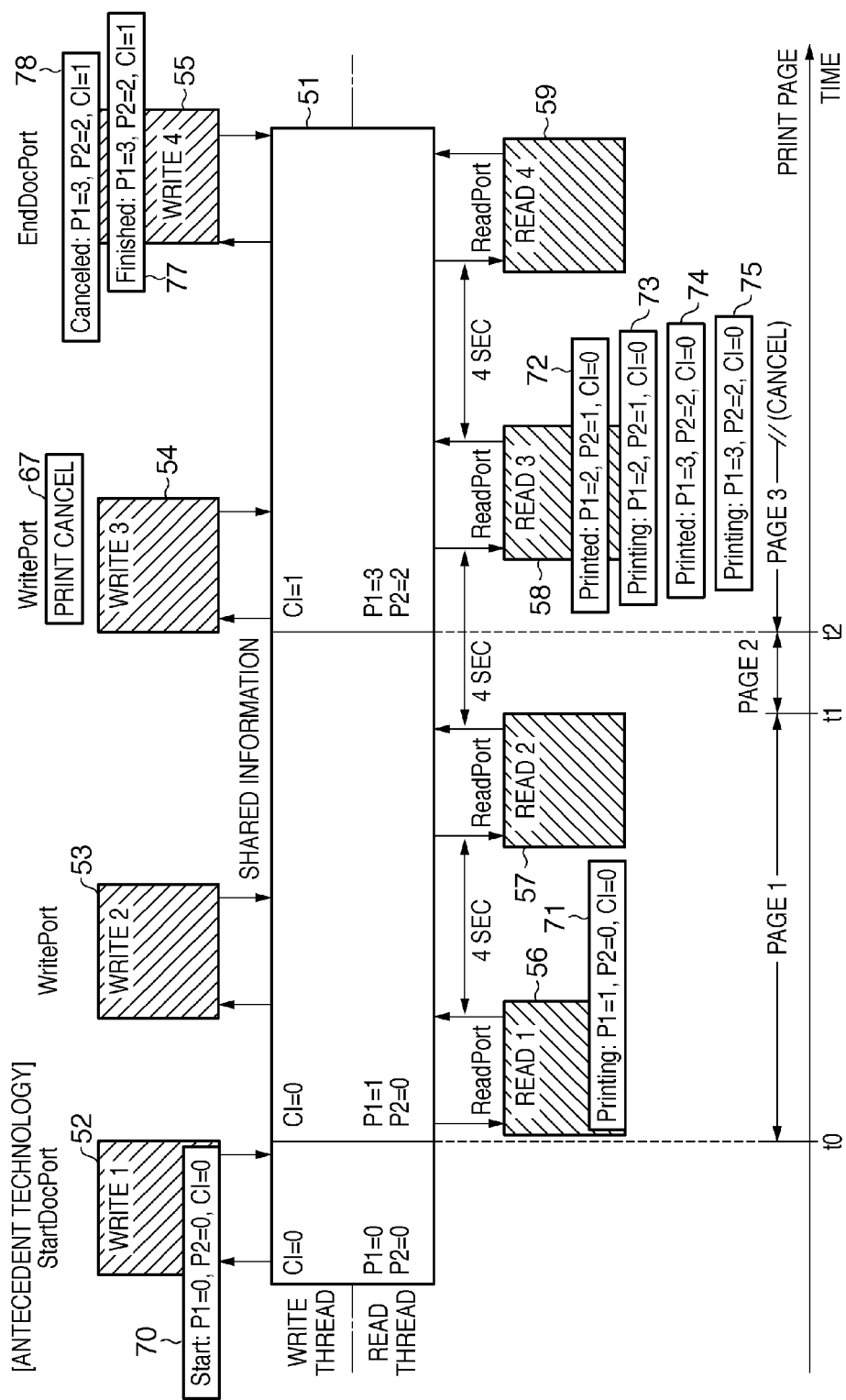

FIG. 14

[JobInfo:70] Ver:100, size:2144, funcId:10000000, jobId:4, commMode:2, printer:ABC Kmmn, user:Koichi, document:PhotoAlbum, pagePrinting:0, pagePrinted:0, canceled:0, failedPrint:0, extendedInfo:NULL ~70

[JobInfo:71] Ver:100, size:2144, funcId:10000001, jobId:4, commMode:2, printer:ABC Kmmn, user:Koichi, document:PhotoAlbum, pagePrinting:1, pagePrinted:0, canceled:0, failedPrint:0, extendedInfo:NULL ~71

[JobInfo:72] Ver:100, size:2144, funcId:10000002, jobId:4, commMode:2, printer:ABC Kmmn, user:Koichi, document:PhotoAlbum, pagePrinting:2, pagePrinted:1, canceled:0, failedPrint:0, extendedInfo:NULL ~72

[JobInfo:73] Ver:100, size:2144, funcId:10000001, jobId:4, commMode:2, printer:ABC Kmmn, user:Koichi, document:PhotoAlbum, pagePrinting:2, pagePrinted:1, canceled:0, failedPrint:0, extendedInfo:NULL ~73

[JobInfo:74] Ver:100, size:2144, funcId:10000002, jobId:4, commMode:2, printer:ABC Kmmn, user:Koichi, document:PhotoAlbum, pagePrinting:3, pagePrinted:2, canceled:0, failedPrint:0, extendedInfo:NULL ~74

[JobInfo:75] Ver:100, size:2144, funcId:10000001, jobId:4, commMode:2, printer:ABC Kmmn, user:Koichi, document:PhotoAlbum, pagePrinting:3, pagePrinted:2, canceled:0, failedPrint:0, extendedInfo:NULL ~75

[JobInfo:78] Ver:100, size:2144, funcId:10000004, jobId:5, commMode:2, printer:ABC Kmmn, user:Koichi, document:PhotoAlbum, pagePrinting:3, pagePrinted:2, canceled:1, failedPrint:0, extendedInfo:NULL ~78

[JobInfo:79] Ver:100, size:2144, funcId:10000003, jobId:4, commMode:2, printer:ABC Kmmn, user:Koichi, document:PhotoAlbum, pagePrinting:3, pagePrinted:2, canceled:1, failedPrint:0, extendedInfo:NULL ~77

F I G. 16

[JobInfo:70] Ver:100, size:2144, funcId:10000000, jobId:4, commMode:2, printer:ABC Kmmn, user:Koichi, document:PhotoAlbum, pagePrinting:0, pagePrinted:0, canceled:0, failedPrint:0, extendedInfo:NULL, time:2006-08-14 15:05:10, order:1

[JobInfo:71] Ver:100, size:2144, funcId:10000001, jobId:4, commMode:2, printer:ABC Kmmn, user:Koichi, document:PhotoAlbum, pagePrinting:1, pagePrinted:0, canceled:0, failedPrint:0, extendedInfo:NULL, time:2006-08-14 15:05:15, order:2

[JobInfo:72] Ver:100, size:2144, funcId:10000002, jobId:4, commMode:2, printer:ABC Kmmn, user:Koichi, document:PhotoAlbum, pagePrinting:2, pagePrinted:1, canceled:0, failedPrint:0, extendedInfo:NULL, time:2006-08-14 15:06:11, order:3

[JobInfo:73] Ver:100, size:2144, funcId:10000001, jobId:4, commMode:2, printer:ABC Kmmn, user:Koichi, document:PhotoAlbum, pagePrinting:2, pagePrinted:1, canceled:0, failedPrint:0, extendedInfo:NULL, time:2006-08-14 15:06:12, order:4

[JobInfo:74] Ver:100, size:2144, funcId:10000002, jobId:4, commMode:2, printer:ABC Kmmn, user:Koichi, document:PhotoAlbum, pagePrinting:3, pagePrinted:2, canceled:0, failedPrint:0, extendedInfo:NULL, time:2006-08-14 15:06:13, order:5

[JobInfo:75] Ver:100, size:2144, funcId:10000001, jobId:4, commMode:2, printer:ABC Kmmn, user:Koichi, document:PhotoAlbum, pagePrinting:3, pagePrinted:2, canceled:0, failedPrint:0, extendedInfo:NULL, time:2006-08-14 15:06:14, order:6

[JobInfo:76] Ver:100, size:2144, funcId:10000002, jobId:4, commMode:2, printer:ABC Kmmn, user:Koichi, document:PhotoAlbum, pagePrinting:3, pagePrinted:3, canceled:0, failedPrint:0, extendedInfo:NULL, time:2006-08-14 15:06:45, order:7

[JobInfo:77] Ver:100, size:2144, funcId:10000003, jobId:4, commMode:2, printer:ABC Kmmn, user:Koichi, document:PhotoAlbum, pagePrinting:3, pagePrinted:3, canceled:0, failedPrint:0, extendedInfo:NULL, time:2006-08-14 15:06:50, order:8

[JobInfo:70] Ver:100, size:2144, funcId:10000000, jobId:4, commMode:2, printer:ABC Kmmn, user:Koichi, document:PhotoAlbum, pagePrinting:0, pagePrinted:0, canceled:0, failedPrint:0, extendedInfo:NULL, time:2006-08-14 15:05:10, order:1

[JobInfo:71] Ver:100, size:2144, funcId:10000001, jobId:4, commMode:2, printer:ABC Kmmn, user:Koichi, document:PhotoAlbum, pagePrinting:1, pagePrinted:0, canceled:0, failedPrint:0, extendedInfo:NULL, time:2006-08-14 15:05:15, order:2

[JobInfo:72] Ver:100, size:2144, funcId:10000002, jobId:4, commMode:2, printer:ABC Kmmn, user:Koichi, document:PhotoAlbum, pagePrinting:2, pagePrinted:1, canceled:0, failedPrint:0, extendedInfo:NULL, time:2006-08-14 15:06:11, order:3

[JobInfo:74] Ver:100, size:2144, funcId:10000002, jobId:4, commMode:2, printer:ABC Kmmn, user:Koichi, ~74
document:PhotoAlbum, pagePrinting:3, pagePrinted:2, canceled:0, failedPrint:0, extendedInfo:NULL, time:2006-08-14 15:06:13, order:5

[JobInfo:73] Ver:100, size:2144, funcId:10000001, jobId:4, commMode:2, printer:ABC Kmmn, user:Koichi, ~73
document:PhotoAlbum, pagePrinting:2, pagePrinted:1, canceled:0, failedPrint:0, extendedInfo:NULL, time:2006-08-14 15:06:12, order:4

[JobInfo:75] Ver:100, size:2144, funcId:10000001, jobId:4, commMode:2, printer:ABC Kmmn, user:Koichi, document:PhotoAlbum, pagePrinting:3, pagePrinted:2, canceled:0, failedPrint:0, extendedInfo:NULL, time:2006-08-14 15:06:14, order:6

[JobInfo:76] Ver:100, size:2144, funcId:10000002, jobId:4, commMode:2, printer:ABC Kmmn, user:Koichi, document:PhotoAlbum, pagePrinting:3, pagePrinted:3, canceled:0, failedPrint:0, extendedInfo:NULL, time:2006-08-14 15:06:45, order:7

[JobInfo:77] Ver:100, size:2144, funcId:10000003, jobId:4, commMode:2, printer:ABC Kmmn, user:Koichi, document:PhotoAlbum, pagePrinting:3, pagePrinted:3, canceled:0, failedPrint:0, extendedInfo:NULL, time:2006-08-14 15:06:50, order:8

FIG. 18

| Photo Album Creater | | | | |
|---|---|---|---|---|
| Printer: | | | | |
| ABC Kmmn | Job Information: | | | |
| XYZ model-A | - Owner - | - Document Name - | - ID - | -Status - |
| XYZ model-B | Koichi | PhotoAlbum | 4 | Printing |
| DEF model-C | Misachan | PhotoAlbum2 | 77 | Waiting |
| DEF model-D | | | | |

43

45                                                                                44

Print Status:
| - Page - | - Status - | - Charge [Yen] - |
|---|---|---|
| 1 | Printed (Success) | 100 |
| 2 | Printed (Success) | 100 |
| 3 | Printing | 0 |

Total:
| - Page - | - Charge [Yen] - |
|---|---|
| 2 | 200 |

Information:

46

Cancel

| ORDER INFORMATION (order) | TIMESTAMP (time) | NOTIFICATION TYPE (TIMING) | PRINTING PAGE NUMBER (pagePrinting) | PRINTED PAGE NUMBER (pagePrinted) | NOTIFICATION INFORMATION (JobInfo) |
|---|---|---|---|---|---|
| 1 | 2006-08-14 15:05:10 | START | 0 | 0 | JobInfo:70 |
| 2 | 2006-08-14 15:05:15 | PRINTING | 1 | 0 | JobInfo:71 |
| 3 | 2006-08-14 15:06:11 | PRINTED | 2 | 1 | JobInfo:72 |
| 5 | 2006-08-14 15:06:13 | PRINTED | 3 | 2 | JobInfo:74 |

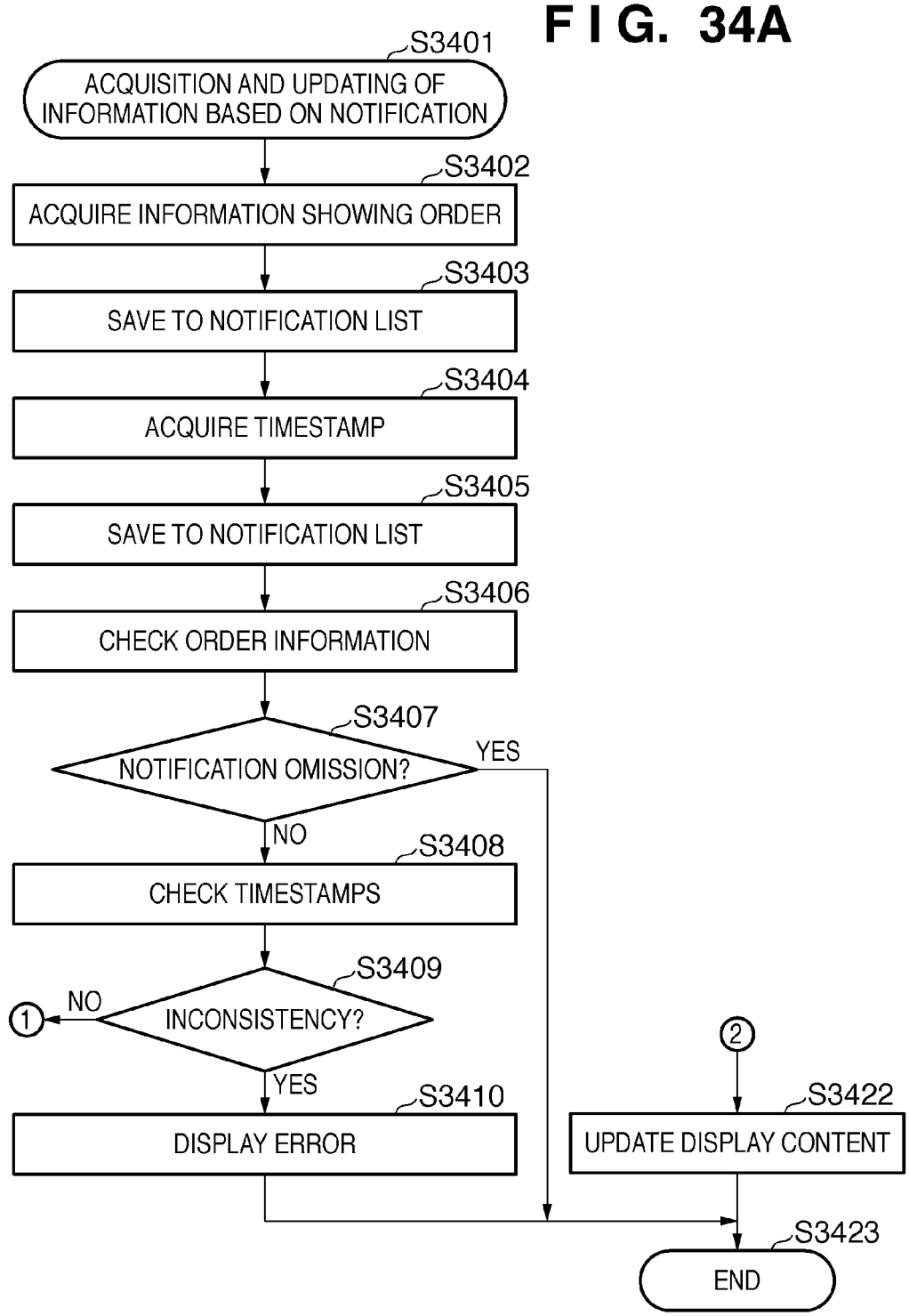

| PAGE:1 | COMMANDS SHOWING OTHER STATES |
|---|---|

81　80　82

[ANTECEDENT TECHNOLOGY]

F I G. 38
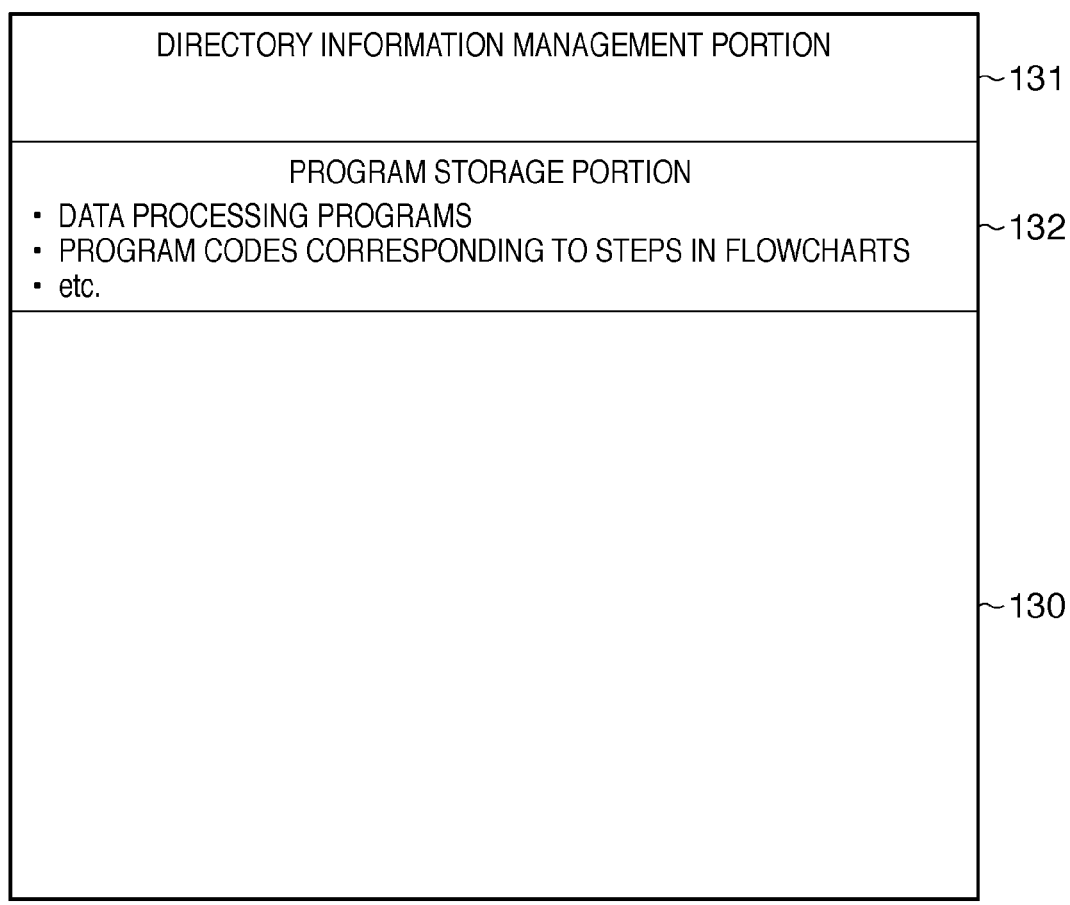

PERIPHERAL DEVICE CONTROL SYSTEM

BACKGROUND OF THE INVENTION

1. Field of the Invention

The present invention relates to a peripheral device control system.

2. Description of the Related Art

In recent years, network-enabled printers, copiers, facsimiles, scanners, digital cameras, and devices provided with these multiple functions (peripheral devices) have spread rapidly following improvements in network infrastructure. This has led to cases where it is necessary to have an accurate grasp of the usage, including the state of progress, of a peripheral device. An application that charges according to the number of sheets output by a printer is an example of such a case. A billing application will be given as an exemplary application that charges according to the usage of a peripheral device.

Here, in the case where a high-performance printer such as a laser beam printer (LBP) or a copier is used as an exemplary peripheral device, there exist printing systems in which a billing application charges for printed pages in accordance with the content of notifications related to a print job issued from the printer. The use of a high-performance printer in such printing systems means that the printer can itself monitor the print status of each page and issue appropriate notifications related to a print job according to the print status. Therefore billing can be performed accurately in the application.

On the other hand, a low-performance printer, such as an inkjet printer constituting an exemplary peripheral device is not provided with the notification function related to print jobs. In this case, a printing system has been devised in which notifications related to a print job are issued using the printer driver required for controlling the printer, installed on an information processing apparatus connected to the printer (e.g., see JP 3841023). JP 3841023 discloses that status information of the printer is notified from a notification terminal to an annunciation terminal by acquiring the status information from the notification terminal by polling.

In a printing system that uses such a low-performance printer, the status of a print job is monitored using a ReadPort function constituting a 4-second periodical interrupt function, for example. The status of a print job can also be obtained when writing is performed using a WritePort function or the like. However, the following problems occur since monitoring of the job status is performed by polling and is not always synchronized with the progress of the printing process.

(1) The information processing apparatus may be unable to monitor the print status of pages with little print data, for example, and will be unable to issue "Printing" or "Printed" notifications for pages that could not be monitored. Shared information is information managed by a language monitor (discussed below), and includes the status of the printer such as, for example, print progress information, or in other words, the job status. In the case where write and read functions are executed, however, the language monitor acquires the job status from the printer, and if there is a change in the status, the language monitor returns the job status to the function caller as notification information (also referred to as job information). Therefore, even assuming that the job status changes a plurality of times between two functions in close proximity to one another, the value of that job status will be notified to the function caller as if there was only one change from the status captured by the first function to the status captured by the subsequent function.

For example, assume that a ReadPort function for reading the job status from the shared information is executed every four seconds. If the printing of a certain page starts and ends between the processing of the two ReadPort functions, neither a print start notification ("Printing" notification) nor a print end notification ("Printed" notification) will be issued for that page.

(2) When a print job is canceled by the operator, a "Canceled" notification is issued before the "Printing" or "Printed" notifications of pages with respect to which printing has normally started or ended. Therefore, the order of notifications related to the print job will be inaccurate. For example, assume that after the printing of a certain page P has ended and the printing of the next page Q has started, printing is canceled before the "Printed" notification of page P and the "Printing" notification of page Q are issued. In this case, cancel information is set using a WritePort function for instructing cancellation, and a "Canceled" notification is issued to the WritePort function. The "Printed" notification of page P and the "Printing" notification of page Q are then issued to the ReadPort function subsequently executed. Moreover, the cancel information included in these "Printed" and "Printing" notifications will show "canceled", despite the printing of these pages having been respectively ended and started prior before the cancellation.

(3) Notifications related to a print job issued by the printer driver may, when received by the application, be received in a different order to the order in which they were issued, due to being affected by processing in the OS or the like.

SUMMARY OF THE INVENTION

The present invention has been made in consideration of the above prior art, and has as its object to provide a printer control apparatus, a printer control program and a printer control method that resolve the above problems.

To attain the above object, the present invention is provided with the following configuration. That is, a peripheral device control system comprises a first information processing apparatus and a peripheral device, wherein the first information processing apparatus includes an acquisition unit that acquires peripheral device information related to the peripheral device from the peripheral device, a notification information generation unit that generates notification information from the peripheral device information, and a notification unit that notifies the notification information, and wherein the acquisition unit acquires the peripheral device information from the peripheral device at a given time interval, the notification information generation unit generates notification information from first peripheral device information of a certain time and second peripheral device information of a different time, and the notification unit notifies the notification information.

According to another aspect, the present invention is an information processing apparatus comprises an acquisition unit that acquires peripheral device information related to a peripheral device from the peripheral device; a notification information generation unit that generates notification information from the peripheral device information; and a notification unit that notifies the notification information, wherein the acquisition unit acquires the peripheral device information from the peripheral device at a given time interval, the notification information generation unit generates notification information from first peripheral device information of a certain time and second peripheral device information of a different time, and the notification unit notifies the notification information.

According to another aspect, the present invention is an information processing apparatus connected to a peripheral device, comprises an acquisition unit that acquires peripheral device information related to the peripheral device from the peripheral device; a notification information generation unit that generates notification information from the peripheral device information; and a notification unit that notifies the notification information to a second information processing apparatus, wherein the acquisition unit acquires the peripheral device information from the peripheral device at a given time interval, the notification information generation unit generates notification information from first peripheral device information of a certain time and second peripheral device information of a different time, and the notification unit notifies the notification information.

According to another aspect, the present invention is a printer control apparatus that notifies a print progress to an apparatus, comprises a save unit that saves a printing page number last notified and a printed page number last notified; an acquisition unit that acquires a current printing page number from a printer every fixed time period; and an issuance unit that determines, based on the current printing page number and the printing page number last notified, whether there exists a page with respect to which a printing page number notification has not been issued or a page with respect to which a printed page number notification has not been issued, and if determined to exist, issues a printing notification or a printed notification for each corresponding page in the stated order.

The following effects are obtained as a result of the above configurations.

(1) Notifications such as "Printing" and "Printed" can be correctly issued, even in relation to the print status of a page with little print data that cannot be monitored by the information processing apparatus.

(2) When a print job is canceled by the operator, a "Canceled" notification can be issued after the "Printing" and "Printed" notifications of pages with respect to which printing has been normally started or ended have been issued. Therefore notifications related to a print job can be issued with accurate timing and in the correct order.

(3) Notifications related to a print job can be issued with the correct content.

(4) Even in the case where notifications related to a print job issued by a printer driver are received by an application in a different order to the order in which they were issued, due to being affected by processing in the OS or the like, the notifications can be processed accurately after being converted to the correct order. This enables a highly reliable peripheral control system to be realized.

Further features of the present invention will become apparent from the following description of exemplary embodiments (with reference to the attached drawings).

BRIEF DESCRIPTION OF THE DRAWINGS

FIG. 6 indicates a map of notification types and notification IDs.

FIG. 7 is a timing chart of a conventional art of a notification function related to print jobs.

FIG. 8 is a diagram of a conventional art indicating the content of notifications related to a print job.

FIG. 10 is a diagram of a conventional art indicating the content of notifications related to a print job.

FIG. 12 indicates the content of notifications related to a print job.

FIG. 13 is a timing chart of the notification function related to print jobs.

FIG. 14 indicates the content of notifications related to a print job.

FIG. 16 indicates the content of notifications related to a print job.

FIG. 17 indicates the content of notifications related to a print job.

FIG. 18 indicates a user interface of a billing application (Photo Album Creator).

FIG. 33 indicates a notification list.

FIGS. 34A and 34B are flowcharts indicating a process of acquiring and updating information based on a notification in the application 30.

FIG. 38 shows a memory map of a storage medium storing various data processing programs readable in the peripheral device control system according to the present invention.

DESCRIPTION OF THE EMBODIMENTS

Embodiments of the present invention will now be described with reference to the drawings. Functions (information) cited below that are not described in detail are disclosed in the Help menu of "MSDN Library for Visual Studio 2005" (Japanese Version) in "MSDN (registered trademark) Subscriptions Library" (Disc 1), January 2007 (Japanese Version DVD). As such, description thereof is omitted.

Since USB, which stands for Universal Serial Bus, is a known interface capable of bidirectional communication, a detailed description thereof will be omitted below. The following abbreviations are used in the following timing charts (shown in FIGS. 7, 9, 11, 13) and the diagrams indicating the notification content (shown in FIGS. 8, 10, 12, 14, etc.).

Figure 5:
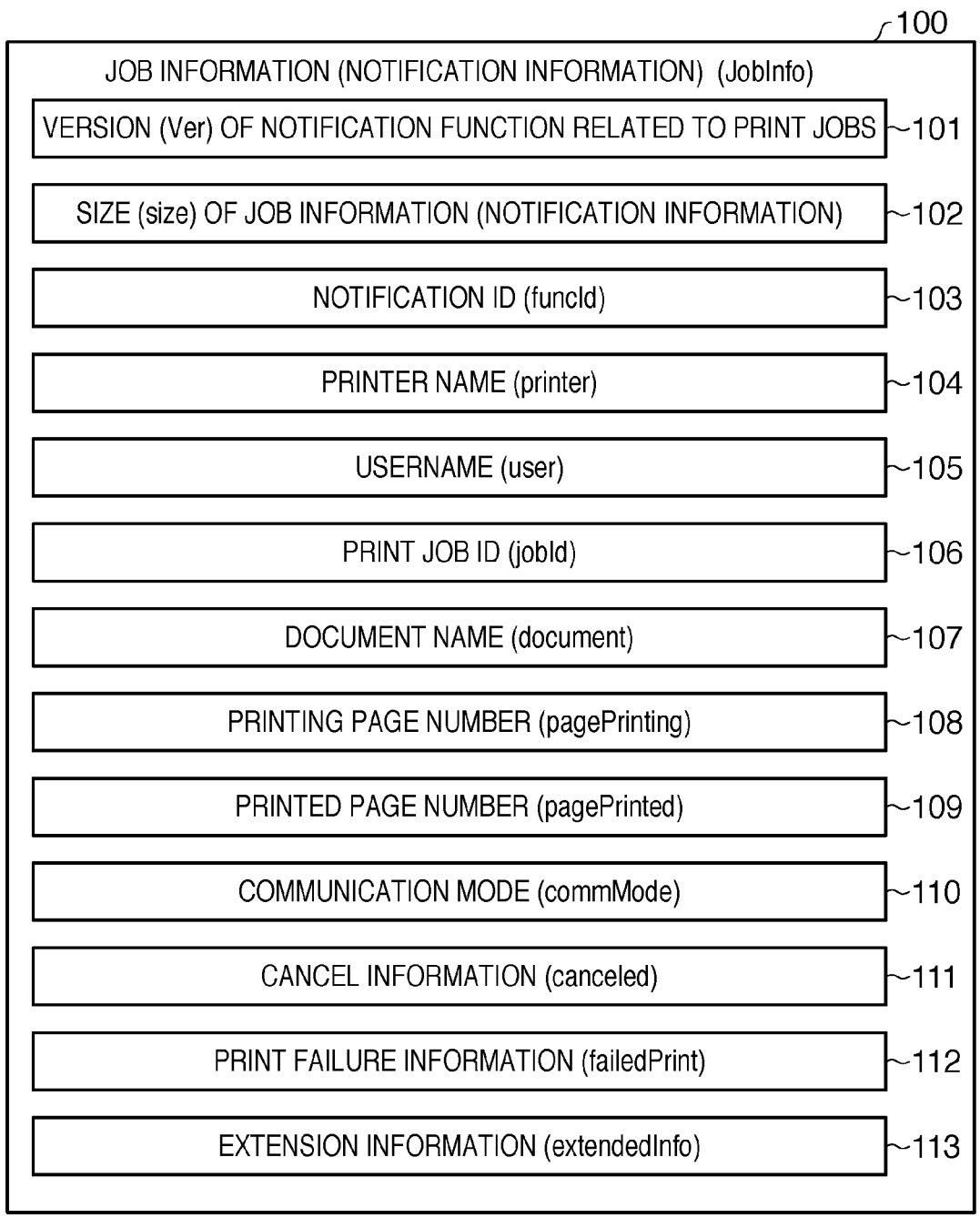
FIG. 5 indicates job information (JobInfo).

P1 in the timing charts is equivalent to "pagePrinting" in the notification content, and to page number 108 of print material that is being printed in the job information of FIG. 5. P2 in the timing charts is equivalent to "pagePrinted" in the notification content, and to page number 109 of print material that has been printed in the job information of FIG. 5. CI in the timing charts is equivalent to "canceled" in the notification content, and to cancel information 111 in the job information of FIG. 5.

First Embodiment

Figure 1:
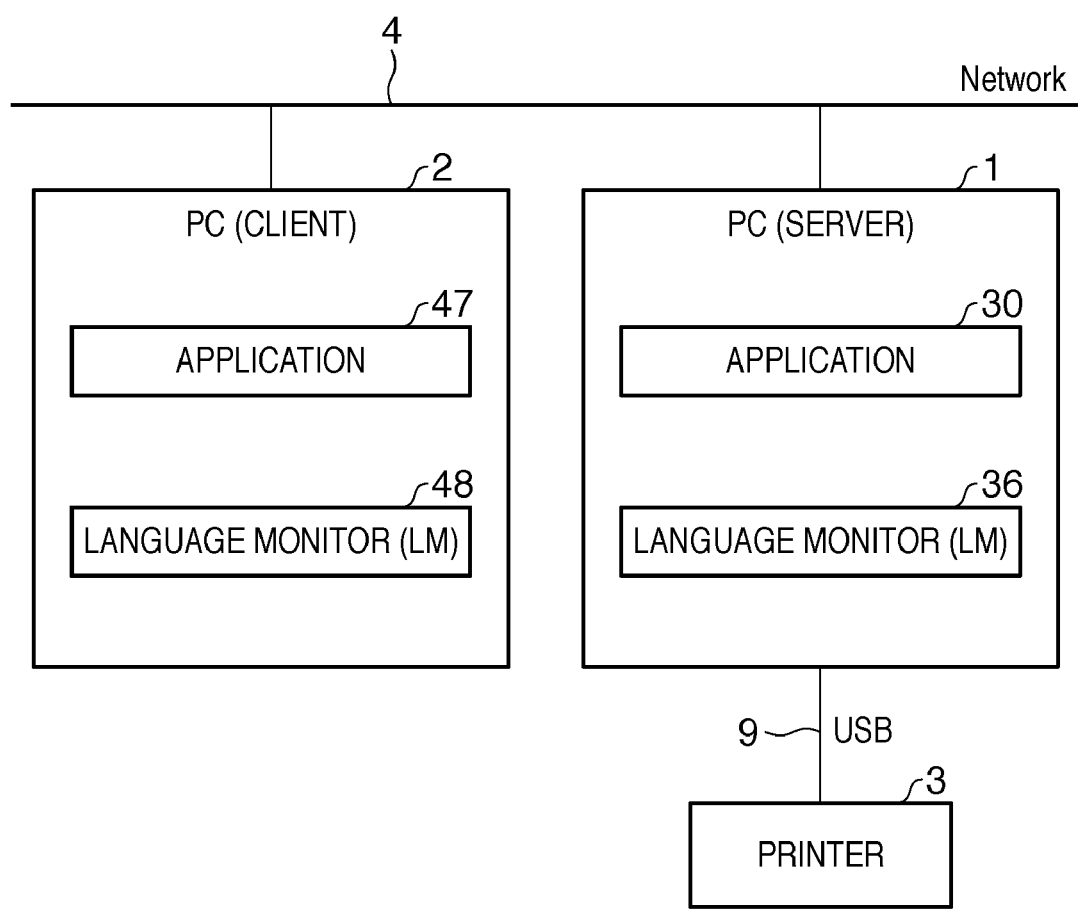
FIG. 1 is a block diagram indicating constituent portions of a system in an embodiment of a peripheral device control system composed of an information processing apparatus and a peripheral device according to the present invention.
Figure 3:
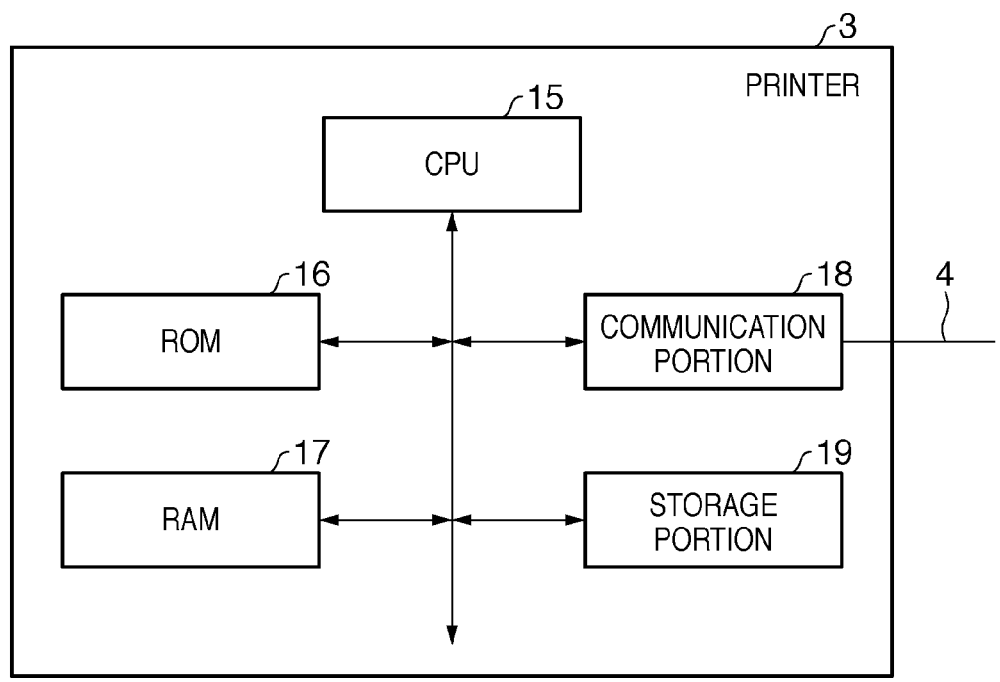
FIG. 3 is a block diagram indicating a hardware configuration of a printer.
Figure 4:
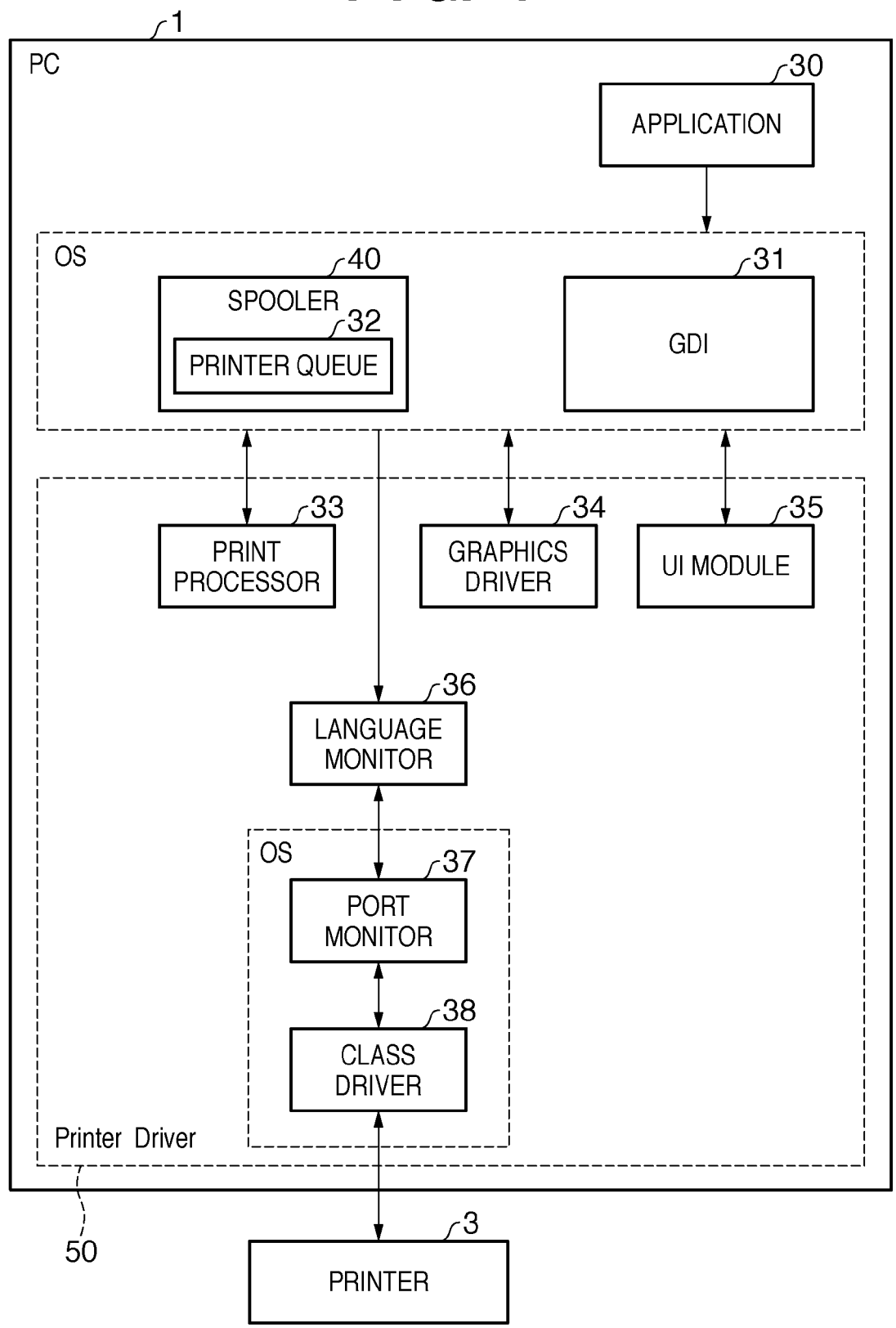
FIG. 4 indicates a configuration of a printer driver in a PC 1.

FIG. 1 is a block diagram indicating constituent portions of a system in an embodiment of a peripheral device control system composed of an information processing apparatus and a peripheral device according to the present invention. In FIG. 1, information processing apparatuses 1 and 2 are constituted by a generic personal computer (hereinafter, may be shortened to PC). The PCs 1 and 2 are constituted by hardware such as will be discussed below in FIG. 2, and U.S. Microsoft Windows Vista (registered trademark) is installed as the operating system (OS). The PCs 1 and 2 are connected via a network 4 constituted by Ethernet (registered trademark), and can communicate with one another bidirectionally. A printer 3 is constituted by a color inkjet printer, and is given as an exemplary peripheral device of the present invention. The model name of the printer 3 is given as company ABC's Kmmn. Note that in terms of the peripheral device of the present invention, a printer, a copier, a facsimile, a scanner, a digital camera, a device provided with these multiple functions, or the like are applicable. The printer 3, which is constituted by hardware such as will be discussed below in FIG. 3, is connected to the PC 1 via an USB interface 9 and can communicate bidirectionally therewith. Language monitors 36 and 48, which will be discussed below in FIG. 4, are constituted by a dynamic link library for Windows (registered trademark). Applications 30 and 47 are constituted by Windows executable files (*.exe). In terms of exemplary applications of the present invention, the applications 30 and 47 are billing applications (Photo Album Creator) such as shown in FIG. 18.

The following two printing systems are given as examples of the peripheral device control system of the present invention, although the description hereinafter focuses on the local printing example.

(1) A local printing system that prints on the printer 3 from an application 30 in the PC 1 via the USB interface 9. In this system, the PC 1 is equivalent to a first information processing apparatus.

(2) A network printing system in which the PCs 1 and 2 have a server-client relation, and the PC 1 is provided with a print server function that enables printing from another information processing apparatus (PC 2) via the network 4, with the printer 3 as a shared printer. Note that this printing function is called network printing. Here, the server is equivalent to a first information processing apparatus, and the client is equivalent to a second information processing apparatus.

The peripheral device control system of the present invention is provided with a notification function related to print jobs that uses Asynchronous Printing Notification Interfaces disclosed on the MSDN site. The PC 2 is able to receive information notified by the LM 36 in the PC 1, using these Asynchronous Printing Notification Interfaces. Since the notification function using these Asynchronous Printing Notification Interfaces is a known function of Windows Vista (registered trademark), a detailed description thereof is omitted.

PC Hardware

Figure 2:
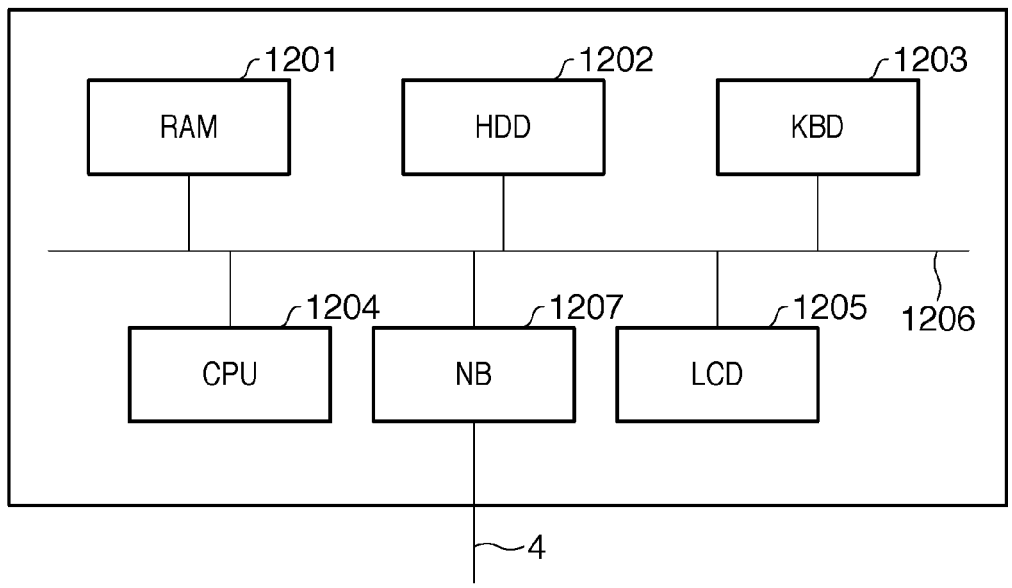
FIG. 2 is a block diagram indicating an exemplary hardware configuration of a PC.

FIG. 2 is a block diagram indicating an exemplary hardware configuration of a PC. While the PCs 1 and 2 both have a hardware configuration such as shown in FIG. 2, the PC 1 will be described here as an example. The PC 1 has a random access memory (RAM 1201), a hard disk drive (HDD 1202) constituting a storage portion, a keyboard (KBD 1203) constituting an exemplary input portion, and a CPU 1204 of a control portion. The PC 1 further includes a display (LCD 1205) constituting an exemplary display portion, a network board (NB 1207) constituting an exemplary communication control portion, and a bus 1206 that connects the above constituent elements of the PC 1. Note that the storage unit may be a portable CD-ROM, a built-in ROM or the like. Modules (LM 36, etc.) of the PC 1 shown in FIG. 1 are stored in the HDD 1202, and read out to the RAM 1201 and executed by the CPU 1204 as necessary. The CPU 1204 thereby realizes the functions of the modules shown in FIG. 1.

Printer Hardware

FIG. 3 is a block diagram indicating a hardware configuration of a printer. The printer 3 has a hardware configuration such as shown in FIG. 3. In FIG. 3, a CPU 15 constituted by a microprocessor or the like controls a RAM 17, a communication portion 18 and a recording portion 19 in accordance with computer programs stored in a ROM 16, as the central processing unit of the printer 3. The ROM 16 stores computer programs for the printer 3 to perform recording (printing) and processing for conveying states to the PC 1 under the control of a printer driver 50 (discussed below in FIG. 4). The printer driver can also be referred to as a printer control program for controlling a printer. Further, a computer on which a printer control program is run by the CPU can also be referred to as a printer control apparatus. The RAM 17 mainly temporarily stores print data sent from the PC 1 for printing by the recording portion 19 based thereon. The communication portion 18 includes connection ports for the USB interface 9, and controls USB communication. The recording portion 19 is constituted by a recording unit constituted by an inkjet recording head, color inks, a cartridge, a recording paper conveying mechanism and the like, and an electrical circuit constituted by an ASIC for generating a print pulse in the recording head base on the print data. The display content (image data) of a file opened by an application is temporarily stored in the HDD 1202 of the PC 1 as an EMF spool file, as a result of a print operation on a print-enabled application. The image data is converted to print data that includes commands for controlling the printer 3 via the printer driver 50, and the print data is then sent to the printer 3 via the USB interface 9. The print data received by the printer 3 is converted to a print pulse by the recording portion 19 and printed on recording paper.

Configuration of Printer Driver

FIG. 4 indicates a configuration of the printer driver in the PC 1. In FIG. 4, the printer driver 50 installed on the PC 1 is constituted by a plurality of modules 33 to 38. The print-enabled application 30 is equivalent, for example, to Notepad (notepad.exe) constituting a text editor that comes standard with the Windows Vista (registered trademark) OS. Note that in the present invention, the application 30 is a billing application (Photo Album Creator) such as shown in FIG. 18. A graphics device interface (GDI) 31 is part of the Windows Vista (registered trademark) OS. A printer queue 32 is constituted as part of a spooler 40, and print jobs are queued therein. Queued print jobs are displayed in a printer queue folder (description is omitted here). A print processor 33 changes the print layout and performs specific processing on print images. A graphics driver 34 performs image processing for printing based on draw commands sent from the GDI 31, and creates print control commands, as the core image processing of the printer driver. A user interface (UI) module 35 provides and controls a user interface of the printer driver. The language monitor 36 controls data transmission and reception as a data communication interface (I/F). A port monitor 37 performs processing to transmit data sent from the language monitor 36 to an appropriate port, and receive data sent from the printer 3 via a class driver 38. The class driver 38, which is a low level module nearest the ports, is equivalent to a USB printer class driver and controls the ports (USB ports in the present invention) in the present invention. The printer driver 50 is manufactured by ABC, the manufacturer of the printer 3.

Content of Job Information

FIG. 5 indicates job information (JobInfo). Job information is included in shared information 51 shown in FIG. 7. Job information may also be referred to as notification information. In FIG. 5, job information (JobInfo) 100 includes information (job status notification) notified from the LM 36 to the application 30 with the notification function related to print jobs. The application 30 is capable of receiving job information (notification information). A version (Ver) 101 of the notification function related to print jobs is used as an object for checking the consistency of information notified from the LM 36 to the application 30. A size (size) 102 of job information is the data size of the job information 100 represented in bytes. A notification ID (funcId) 103 shows the type (timing) of a notification related to the print job. A printer name (printer) 104 is the name of the printer printing the print job. A username (user) 105 shows the owner of the print job. A print job ID (jobId) 106 is a unique ID allocated to the print job. A document name (document) 107 shows the document name of the print job. A printing page number (pagePrinting) 108 indicates the page number of a page that is being printed by the printer. A printed page number (pagePrinted) 109 indicates the page number of a page that has been printed by the printer. A communication mode (commMode) 110 shows the communication mode of the PC 1 and the printer 3, with "0" signifying "unknown", "1" signifying unidirectional communication, and "2" signifying bidirectional communication. Cancel information (canceled) 111 shows whether the print job has been canceled, with "0" signifying "not canceled" and "1" signifying "canceled". Although a canceled print job is indicated with "1" in the present embodiment, the present invention is not limited to this example, and a canceled print job may be indicated with information that includes the canceled page number, for example. Print failure information (failedPrint) 112 shows whether the print job has failed, with "0" signifying success and "1" signifying failure. Although a failed print job is indicated with "1" in the present embodiment, the present invention is not limited to this example, and a failed print job may be indicated with information that includes the failed page number, for example. A paper jam is an example of a print job failure. Extension information (extendedInfo) 113 is used for extending. Since there is no extension information in the present embodiment, the extension information (extendedInfo) 113 is always set to NULL indicating that there is no extension information.

FIG. 6 indicates a map of notification types and notification IDs. As shown in FIG. 6, values set in the notification ID (funcId) 103 are defined respectively in relation to the types (timing) of notification.

Job Status Notification Timing of a Conventional Art

FIG. 7 is a timing chart of a conventional art of the notification function related to print jobs. FIG. 7 indicates controls in the language monitor (hereinafter, may be shortened to "LM") 36 of a peripheral device control system such as shown in FIG. 1. In FIG. 7, the functions 52, 53, 54 and 55 indicate the processing of functions called by a write thread generated from the process of the spooler 40, with the functions 52, 53, 54 and 55 being called from the spooler 40 in the stated order. The function 52 is a StartDocPort function that is called from the spooler 40 when the print job is started, with initialization processes and the like being performed in the LM 36 and the printer 3 when printing is started. The functions 53 and 54 are WritePort functions. Print control commands generated by the graphics driver 34 are passed from the spooler 40 to the LM 36 using these functions, and the LM 36 transmits the print control commands to the printer 3. The function 55 is an EndDocPort function that is called from the spooler 40 when the print job ends, with initialization processes and the like being performed in the LM 36 and the printer 3 when printing is ended. Functions 56, 57, 58 and 59 are ReadPort functions that indicate the processing of interrupt functions of a read thread generated by the LM 36 in the StartDocPort function 52. Functions 56, 57, 58 and 59 are called in the stated order as periodical interrupts every four seconds. Job information (JobInfo) 100 for notifying with the notification function related to print jobs, and information used for notification control are saved in the shared information 51. The shared information 51 is accessed from a plurality of threads, namely, the write thread generated from the process of the spooler 40 and the read thread generated by the LM 36, and the same information can be referred to from these threads. The shared information is realized by an information sharing means for sharing information between the read thread and the write thread. Job status notifications 60, 61, 62, 63, 64 and 65 are notifications related to the print job, and correspond respectively to one of the notification types shown in FIG. 6. The job status notification 60 is the "Start" notification, issued at the start of the print job. The job status notification 61 is the "Printing" notification of a first page, issued when the printer 3 starts printing the first page of the print job. The job status notification 62 is the "Printed" notification of a second page, issued when the printer 3 finishes printing the second page of the print job. The job status notification 63 is the "Printing" notification of a third page, issued when the printer 3 starts printing the third page of the print job. The job status notification 64 is the "Printed" notification of the third page, issued when the printer 3 finishes printing the third page of the print job. The job status notification 65 is the "Finished" notification, issued at the completion of the print job. In FIG. 7, printing page numbers 108, printed page numbers 109 and cancel information 111 are picked up from the job information (JobInfo) 100 in the notifications, and described. The cancel information 111 in all of the notification related to the print job in FIG. 7 is "0". This indicates that printing was completed without the print job being canceled.

FIG. 8 is a diagram of a conventional art indicating the content of notifications related to a print job. In FIG. 8, the content of the job information (JobInfo) 100 of notifications related to a print job issued by the LM 36 is set down. The content of the job information (JobInfo) 100 of the notifications is set down in the order in which the notifications were issued, from the top down. The content of the job information (JobInfo) 100 is shown in FIG. 5. FIG. 8 indicates the content of notifications related to the print job issued in the example shown in the timing chart of FIG. 7.

Figure 9:
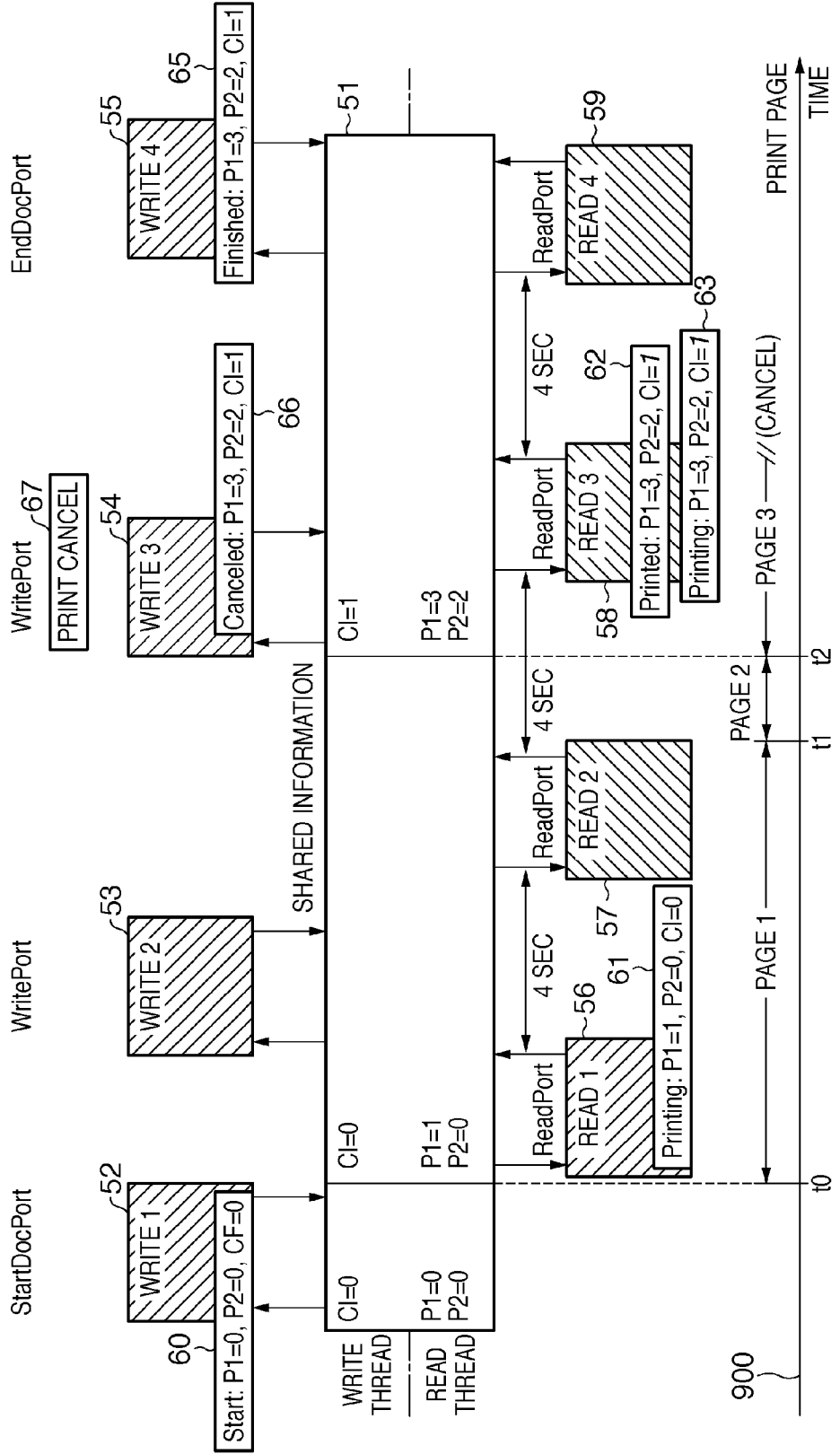
FIG. 9 is a timing chart of a conventional art of the notification function related to print jobs.

FIG. 9 is a timing chart of a conventional art of the notification function related to print jobs. Description of content in FIG. 9 that overlaps with FIG. 7 is omitted here. A print cancel operation 67 indicates that the print job has been canceled by the operator. At this point, the cancel information 111 of the job information (JobInfo) 100 in the shared information 51 is set to "1". A job status notification 66 is a "Canceled" notification, issued when the print job is canceled. FIG. 9 differs from FIG. 7 in that the "Canceled" notification 66 has been issued, and the cancel information 111 in the "Printed" notification 62, the "Printing" notification 63 and the "Finished" notification 65 is set to "1".

FIG. 10 is a diagram of a conventional art indicating the content of notifications related to a print job. In FIG. 10, the content of the job information (JobInfo) 100 of notifications related to a print job issued by the LM 36 is set down. The content of the job information (JobInfo) 100 of the notifications is set down in the order in which the notifications were issued, from the top down. The content of the job information (JobInfo) 100 is shown in FIG. 5. FIG. 10 indicates the content of notifications related to the print job issued in the example shown in the timing chart of FIG. 9. FIG. 10 differs from FIG. 8 in that the "Canceled" notification 66 has been issued, and the cancel information 111 in the "Printed" notification 62 and the "Printing" notification 63 is set to "1". FIG. 10 further differs from FIG. 8 in that the printed page number (pagePrinted) 109 and the cancel information 111 in the "Finished" notification 65 are now respectively "2" and "1".

Job Status Notification Timing of Present Embodiment

Figure 11:
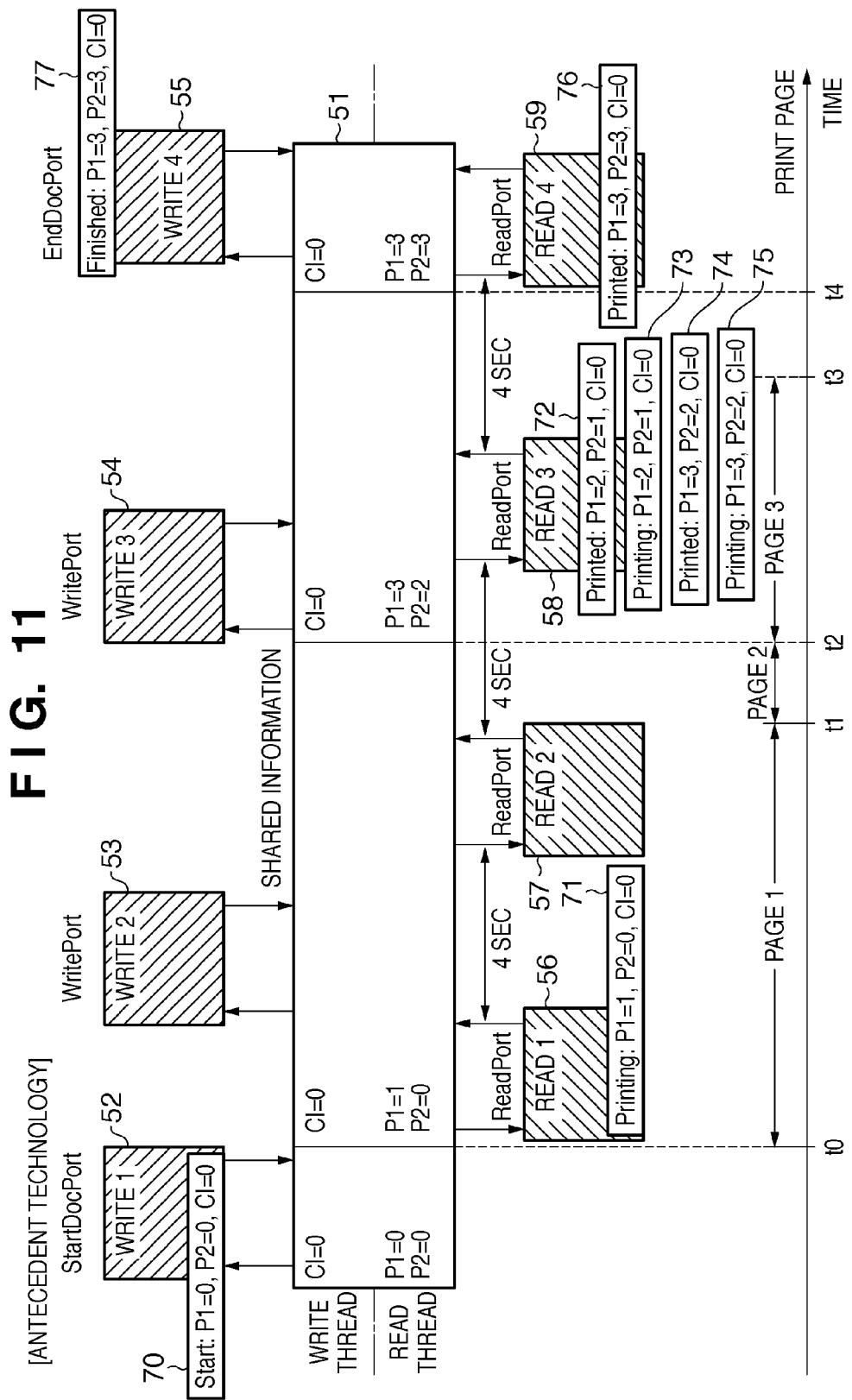
FIG. 11 is a timing chart of the notification function related to print jobs.

FIG. 11 is an exemplary timing chart of the notification function related to print jobs. FIG. 11 indicates controls in the LM 36 of a peripheral device control system such as shown in FIG. 1. In FIG. 11, the functions 52, 53, 54 and 55 indicate the processing of functions called by a write thread generated from the process of the spooler 40, with the functions 52, 53, 54 and 55 being called from the spooler 40 in the stated order. The StartDocPort function 52 is called from the spooler 40 when the print job is started, with initialization processes and the like being performed in the LM 36 and the printer 3 when printing is started. Print control commands generated by the graphics driver 34 are passed from the spooler 40 to the LM 36 using the WritePort functions 53 and 54, and the LM 36 transmits the print control commands to the printer 3. The EndDocPort function 55 is called from the spooler 40 when the print job ends, with initialization processes and the like being performed in the LM 36 and the printer 3 when printing is ended. The read processes 56, 57, 58 and 59 indicate the processing of ReadPort functions constituting interrupt functions of a read thread generated by the LM 36 in the StartDocPort function 52, and are called in the stated order as periodical interrupts every four seconds. Job information (JobInfo) 100 for notifying with the notification function related to print jobs, and information used for notification control are saved in the shared information 51. The shared information 51 is accessed from a plurality of threads, namely, the write thread generated from the process of the spooler 40 and the read thread generated by the LM 36, and the same information can be referred to from these threads. The job information (notification information) is thereby divided into a first notification information group notified from the write thread, and a second notification information group notified from the read thread.

Job status notifications 70, 71, 72, 73, 74, 75, 76 and 77 are notifications related to the print job, and correspond respectively to one of the notification types shown in FIG. 6. Job status notifications are returned to the caller of the function as return values of the function initially executed, after there has been a change in the job information. Further, in the present embodiment, job status notifications will be issued based not only on the latest job information, if the progress status of the job has changed a plurality of times between the execution of one function and the execution of the next function. In the present embodiment, job status notifications that would have been issued if the job information was updated according to the progress of the printer are supplementarily issued.

In FIG. 11, the job status notification 70 is the "Start" notification, issued to the function 52 after the start of a print job. The job status notification 71 is the "Printing" notification of a first page, issued to the function 56 executed after the printer 3 has started printing the first page of the print job. Because there is no change in the status of the printer at the timing of the functions 53 and 57, there is also no change in the job information, and job status notifications are not issued.

The job status notification 72 is the "Printed" notification of the first page, issued to the function 58 executed after the printer 3 has finished printing the first page of the print job. The job status notification 73 is the "Printing" notification of a second page, issued to the function 58 executed after the printer 3 has started printing the second page of the print job. The job status notification 74 is the "Printed" notification of the second page, issued to the function 58 executed after the printer 3 has finished printing the second page of the print job. The job status notification 75 is the "Printing" notification of a third page, issued to the function 58 executed after the printer 3 has started printing the third page of the print job.

The job status notification 76 is the "Printed" notification of the third page, issued to the function 59 executed after the printer 3 has finished printing the third page of the print job. The job status notification 77 is the "Finished" notification, issued to the function 55 executed after the completion of the print job.

In FIG. 11, printing page numbers 108, printed page numbers 109 and cancel information 111 are picked up from the job information (JobInfo) 100 in the notifications, and described. The cancel information 111 in all of the notification related to the print job in FIG. 11 is "0". This indicates that printing was completed without the print job being canceled.

FIG. 12 indicates the content of notifications related to a print job. In FIG. 12, the content of the job information (JobInfo) 100 of notifications related to a print job issued by the LM 36 is set down. The content of the job information (JobInfo) 100 of the notifications is set down in the order in which the notification 70 to 77 were issued, from the top. The content of the job information (JobInfo) 100 is shown in FIG. 5. FIG. 12 indicates the content of notifications related to the print job issued in the example shown in the timing chart of FIG. 11.

FIG. 13 is an exemplary timing chart of the notification function related to print jobs. Description of content in FIG. 13 that overlaps with FIG. 11 is omitted here. The print cancel operation 67 shows that the print job has been canceled by the operator. At this point, the cancel information (CI) 111 of the job information (JobInfo) 100 in the shared information 51 is set to "1". A "Canceled" notification 78 is the job status notification issued to the function 55 executed directly after the print job was canceled. FIG. 13 differs from FIG. 11 in that the "Canceled" notification 78 has been issued, and the cancel information 111 in the "Finished" notification 77 is set to "1".

FIG. 14 indicates the content of notifications related to a print job. In FIG. 14, the content of the job information (JobInfo) 100 of notifications related to a print job issued by the LM 36 is set down. The content of the job information (JobInfo) 100 of the notifications is set down in the order in which the notifications were issued, from the top. The content of the job information (JobInfo) 100 is shown in FIG. 5. FIG. 14 indicates the content of notifications related to the print job issued in the example shown in the timing chart of FIG. 13. FIG. 14 differs from FIG. 12 in that the "Canceled" notification 78 has been issued. Also, the fact that the printed page number (pagePrinted) 109 and the cancel information 111 in the "Finished" notification 77 are now set respectively to "2" and "1" differs from the "Finished" notification 77 in FIG. 12.

Printer Status Command

Figure 35:
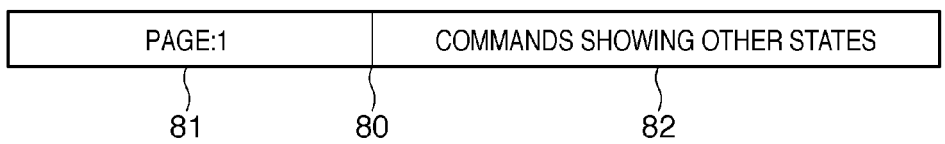
FIG. 35 indicates the content of a printer status command indicating the status of a printer 3.

FIG. 35 indicates the content of a printer status command indicating the status of the printer 3. The printer status command 80 is returned from the printer 3 in response to a data acquisition request issued from the PC 1 to the printer 3 via the USB interface 9. The data acquisition request is issued to the printer whenever the language monitor 36 executes a function. The printer status command indicates the status of the printer 3. The status information of the printer 3 can be acquired from this printer status command 80. A printing page information command 81 included in the printer status command 80 indicates the page number of the page being printed by the printer 3. FIG. 35 indicates a state in which page 1 is being printed. Various status information of the printer 3 is included in the command group 82 indicating other states. A detailed description of these commands is omitted here.

FIG. 18 indicates the user interface (hereinafter, may be shortened to UI) of a billing application (here, Photo Album Creator). The applications 30 and 47 are equivalent to the billing application (Photo Album Creator). In FIG. 18, reference numeral 42 is a main window. Printers connected to the PC 1 via the USB interface and shared printers connected via PCs over the network 4 are all displayed in a printer display portion 43. Note in the example indicated in FIG. 18, printers not illustrated in FIG. 1 are also displayed. In this example, the printer 3 (ABC's Kmmn model) is selected. Information related to all of the print jobs issued to the printer selected in the printer display portion 43 is displayed in a print job information display portion 44. In this example, the owner of the printer job (Owner), the document name (Document Name), the print job ID (ID), and the status (Status) are displayed. Further, the document PhotoAlbum issued by Koichi is selected. The print status of the print job selected in the print job information display portion 44 is displayed in a print status display portion 45. In this example, the Page, Status, Charge[Yen], Total, and Information fields have little or no content. The print cancel operation 67 is executed by pressing a Cancel button 46, enabling the print job selected in the print job information display portion 44 to be canceled.

Content of Shared Information 51

Figure 36:
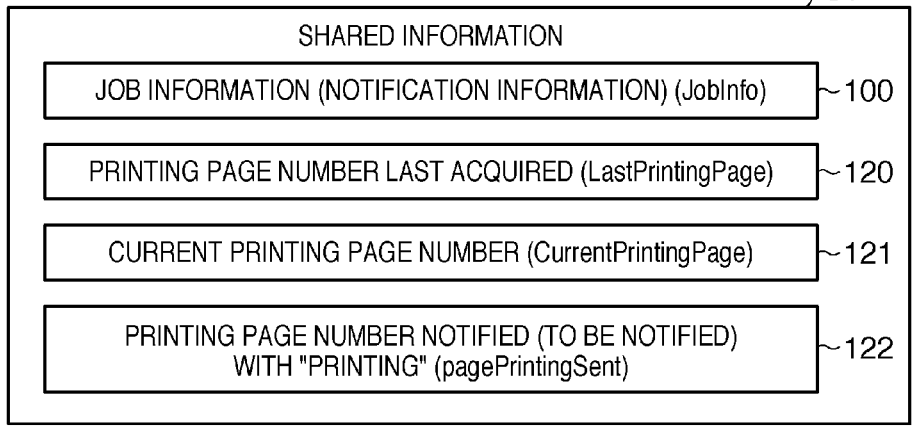
FIG. 36 is a diagram of a conventional art indicating the type of information included in shared information 51.

FIG. 36 is a diagram of a conventional art indicating the type of information included in the shared information 51. In FIG. 36, a page number 120 is a printing page number last acquired (LastPrintingPage), a page number 121 is a current printing page number (CurrentPrintingPage), and a page number 122 is a printing page number notified (or to be notified) by a "Printing" notification (pagePrintingSent). The shared information 51 includes the job information (JobInfo) 100, LastPrintingPage 120, CurrentPrintingPage 121, and pagePrintingSent 122.

Figure 37:
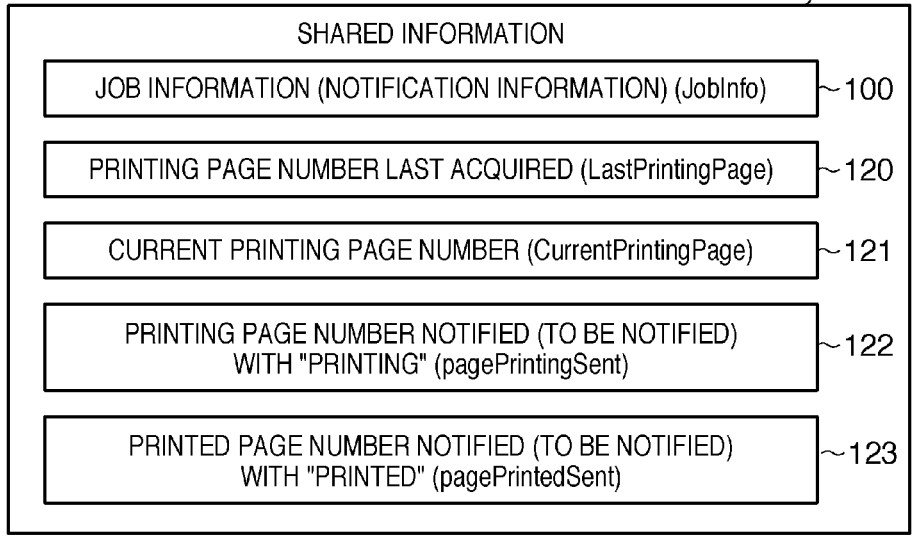
FIG. 37 indicates the type of information included in the shared information 51.

In contrast, FIG. 37 indicates the type of information included in the shared information 51 of the present embodiment. Description of content in FIG. 37 that overlaps with FIG. 36 is omitted here. A page number 123 is a printed page number notified (or to be notified) by a "Printed" notification (pagePrintedSent), and is included in the shared information 51. This pagePrintedSent 123 is information required for controlling the notifications of the notification function related to print jobs by providing a dependency relation related to the order of the notifications, and is one of the characteristics of the present embodiment.

Note that the process of issuing notifications related to a print job will be described in some of the flowcharts described hereinafter. In the present embodiment, this process is executed using the IPrintAsyncNotifyChannel::SendNotification method in the OS.

StartDocPort Function of Present Embodiment

Figure 19:
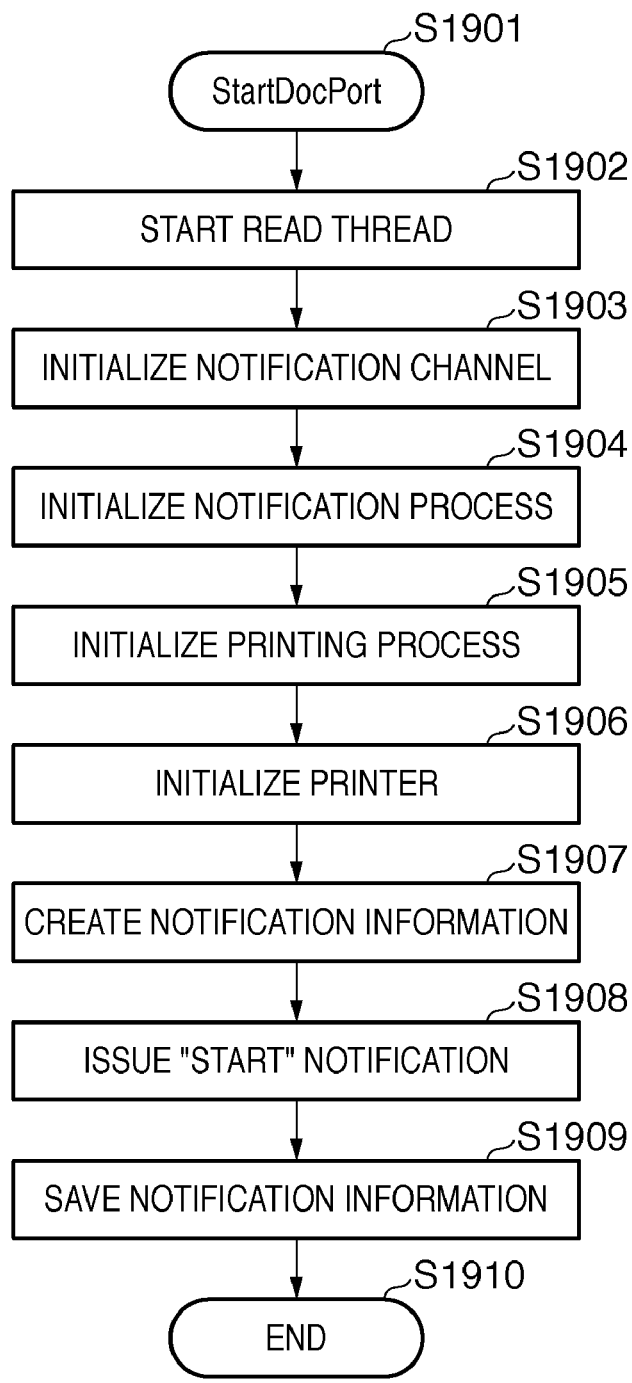
FIG. 19 is a flowchart indicating processing of a StartDocPort function in an LM 36.

FIG. 19 is a flowchart indicating processing of the StartDocPort function in the LM 36. The processing set down in FIG. 19 is performed entirely by the LM 36. When this function is called from the spooler 40 (S1901), the LM 36 starts the read thread (S1902), and initializes the notification channel for the notification function related to print jobs (S1903). Initializing the notification channel involves the LM 36 performing default settings after opening the notification channel for the notification function related to print jobs by calling a CreatePrintAsyncNotifyChannel function in the OS. The LM 36 initializes the notification process (S1904) and the printing process (S1905). Initializing the notification process involves the LM 36 initializing the shared information 51. The LM 36 initializes the printer 3 (S1906), and generates the job information (JobInfo: notification information) 100 (S1907). This is equivalent to the process of generating job information or notification information. Here, the LM 36 sets the information of JobInfo:70 indicating the content of the job information (JobInfo) 100 of the "Printing" notification 70 in FIGS. 12 and 14. The LM 36 issues a "Printing" notification (S1908), saves the content notified by this "Printing" notification to the job information (JobInfo) 100 in the shared information 51 (S1909), and returns to the spooler 40 after terminating the processing of the StartDocPort function (S1910).

WritePort Function of Conventional Art

Figure 20:
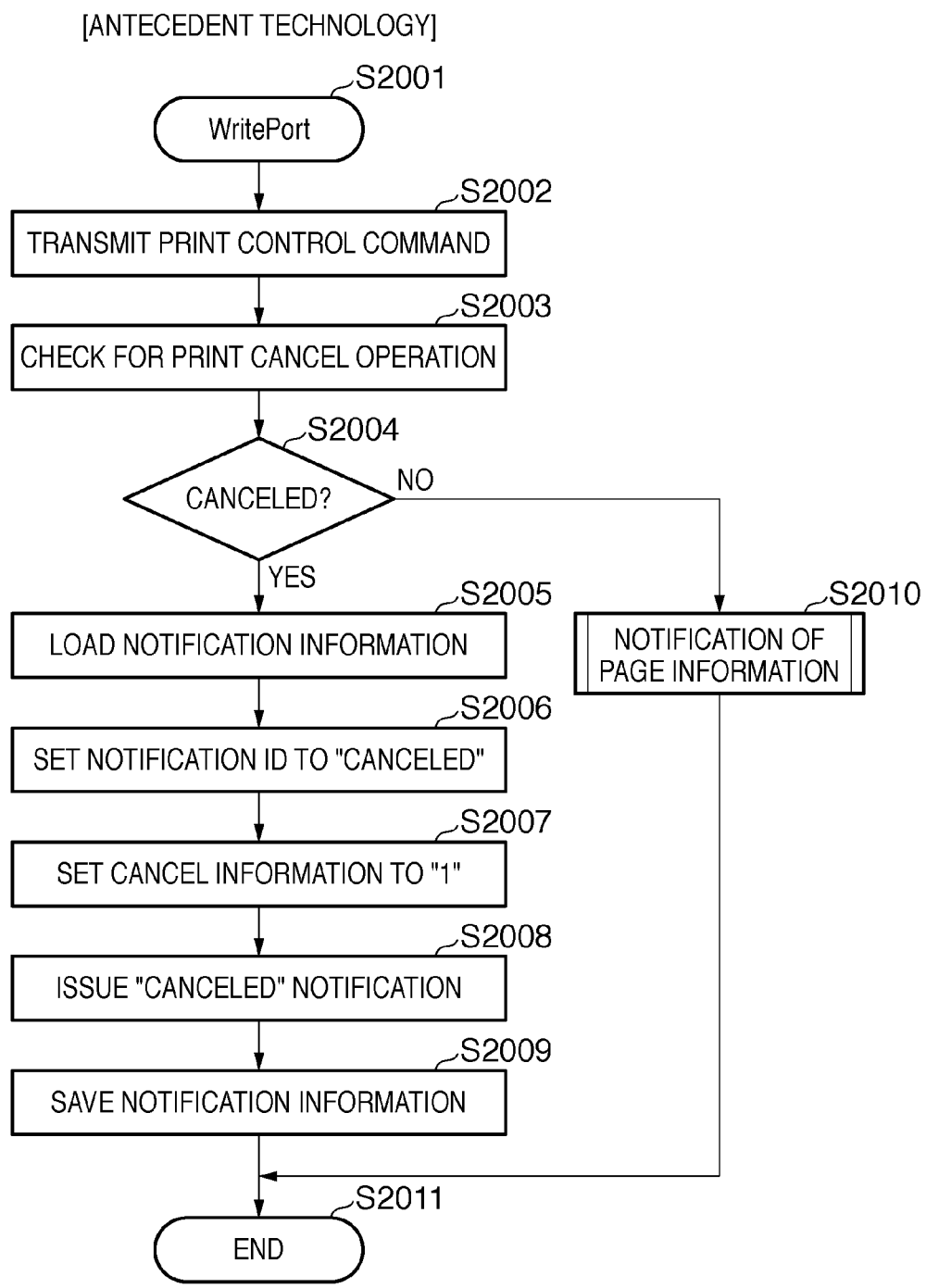
FIG. 20 is a flowchart of a conventional art indicating processing of a WritePort function in the LM 36.

FIG. 20 is a flowchart of a conventional art indicating processing of a WritePort function in the LM 36. The processing set down in FIG. 20 is performed entirely by the LM 36. When this function is called from the spooler 40 (S2001), the LM 36 transmits a print control command to the printer 3 (S2002), and determines whether the print cancel operation 67 has been performed by the operator (S2003). If the print job has been canceled (S2004), the LM 36 loads the job information (JobInfo) 100 (S2005). The LM 36 then sets the notification ID (funcId) 103 to a value indicating "canceled" (S2006), sets the cancel information (canceled) 111 to "1" (S2007), and issues a "Canceled" notification (S2008). The LM 36 saves the content notified by this "Canceled" notification to the job information (JobInfo) 100 in the shared information 51 (S2009), and returns to the spooler 40 after terminating the processing of the WritePort function (S2011). If in step S2004 the print job has not been canceled, the LM 36 executes the process of notifying page information shown in FIG. 22 (S2010), and returns to the spooler 40 after terminating the processing of the WritePort function (S2011).

ReadPort Function of Present Embodiment

Figure 21:
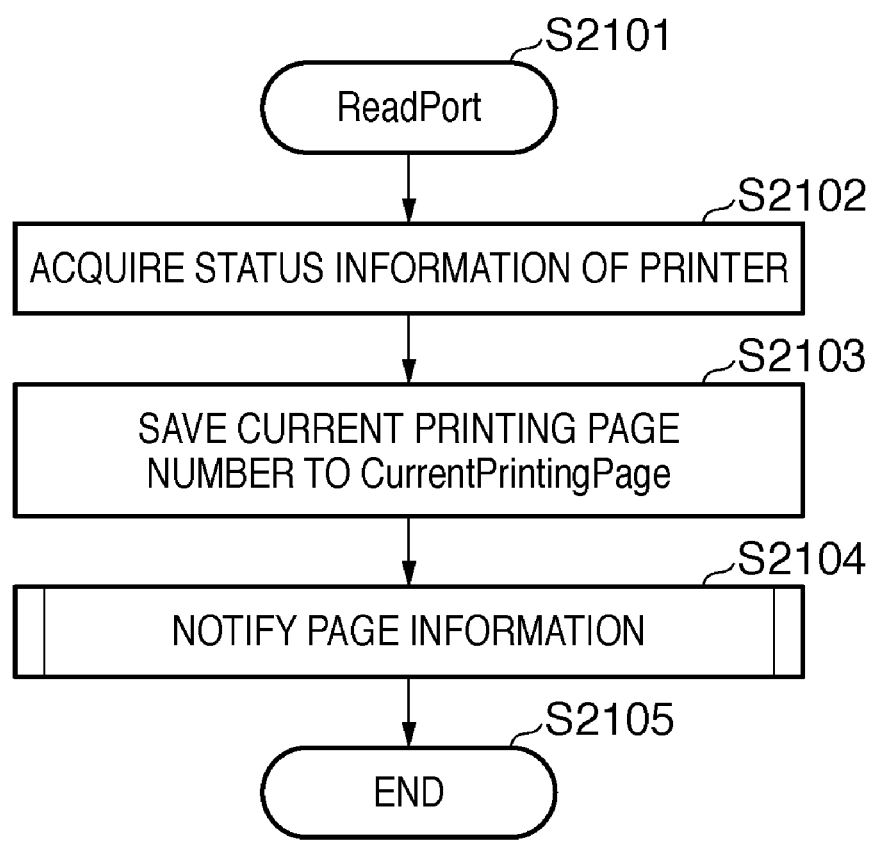
FIG. 21 is a flowchart indicating processing of a ReadPort function in the LM 36.

FIG. 21 is a flowchart indicating processing of the ReadPort function in the LM 36. The processing set down in FIG. 21 is performed entirely by the LM 36. When this function is called from the spooler 40 (S2101), the LM 36 acquires printer status information from the printer 3 using the printer status command 80 (S2102). This process is equivalent to an acquiring means for acquiring the printing page number from a printer. The LM 36 saves the current printing page number included in the acquired information as the printing page information command 81 to CurrentPrintingPage 121 (S2103). The LM 36 executes the process of notifying page information shown in FIG. 25 (S2104), and returns to the spooler 40 after terminating the processing of the ReadPort function (S2105).

Page Information Notification Process of Conventional Art

Figure 22:
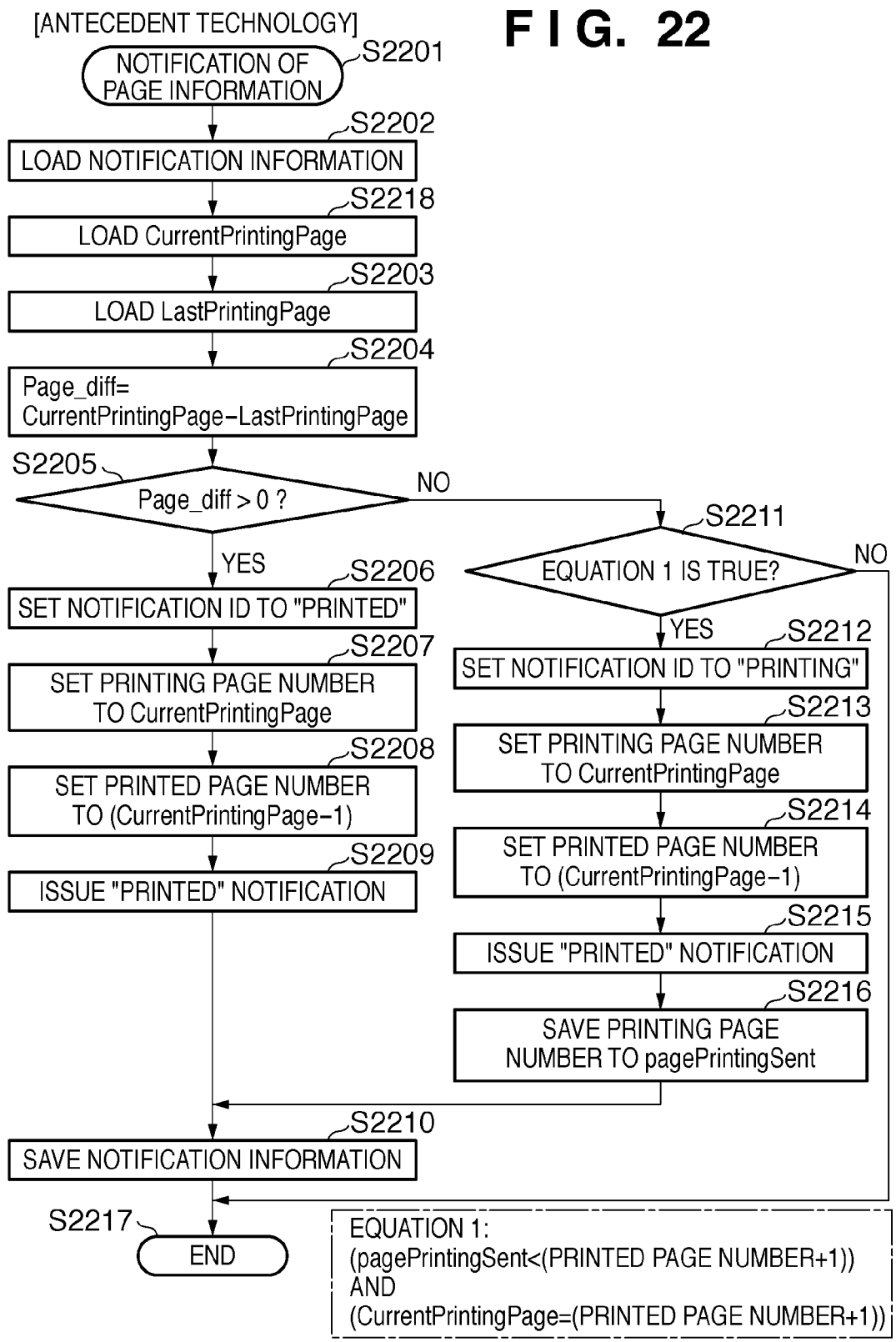
FIG. 22 is a flowchart of a conventional art indicating a process of notifying page information in the LM 36.

FIG. 22 is a flowchart of a conventional art indicating the process of notifying page information in the LM 36. The processing set down in FIG. 22 is performed entirely by the LM 36. This process is called when step S2010 in FIG. 20 is executed. When the process of notifying page information is started (S2201), the LM 36 loads the job information (JobInfo) 100 from the shared information 51 (S2202), and loads CurrentPrintingPage 121 (S2218). The LM 36 also loads LastPrintingPage 120 (S2203). The difference between CurrentPrintingPage 121 and LastPrintingPage 120 is assigned to Page_diff (S2204). If Page_diff is greater than 0, that is, if Page_diff is greater than or equal to 1 in terms of the values Page_diff can take in this example (S2205), the LM 36 sets the notification ID (funcId) 103 to a value indicating "printed" (S2206). The LM 36 sets the printing page number (pagePrinting) 108 to CurrentPrintingPage 121 (S2207). The LM 36 also sets the printed page number (pagePrinted) 109 to a value obtained by subtracting "1" from CurrentPrintingPage 121 (S2208). The LM 36 issues a "Printed" notification (S2209), saves the content notified by this "Printed" notification to the job information (JobInfo) 100 in the shared information 51 (S2210), and returns to the caller after terminating the process of notifying page information (S2217). In step S2205, if Page_diff is less than or equal to 0, that is, if Page_diff is 0 in terms of the values Page_diff can take in this example, the LM 36 determines the value of an equation 1. Equation 1 is (pagePrintingSent 122<(printed page number (pagePrinted) 109+1) and (CurrentPrintingPage 121= (printed page number (pagePrinted) 109+1)). If equation 1 is true (S2211), the LM 36 sets the notification ID (funcId) 103 to a value indicating "printing" (S2212), and sets the printing page number (pagePrinting) 108 to CurrentPrintingPage 121 (S2213). The LM 36 sets the printed page number (pagePrinted) 109 to a value obtained by subtracting "1" from CurrentPrintingPage 121 (S2214), and issues a "Printing" notification (S2215). The LM 36 saves the printing page number (pagePrinting) 108 to pagePrintingSent 122 (S2216), and proceeds to step S2210. On the other hand, if in step S2211 equation 1 is false, the LM 36 returns to the caller after terminating the process of notifying page information (S2217).

EndDocPort Function of Conventional Art

Figure 23:
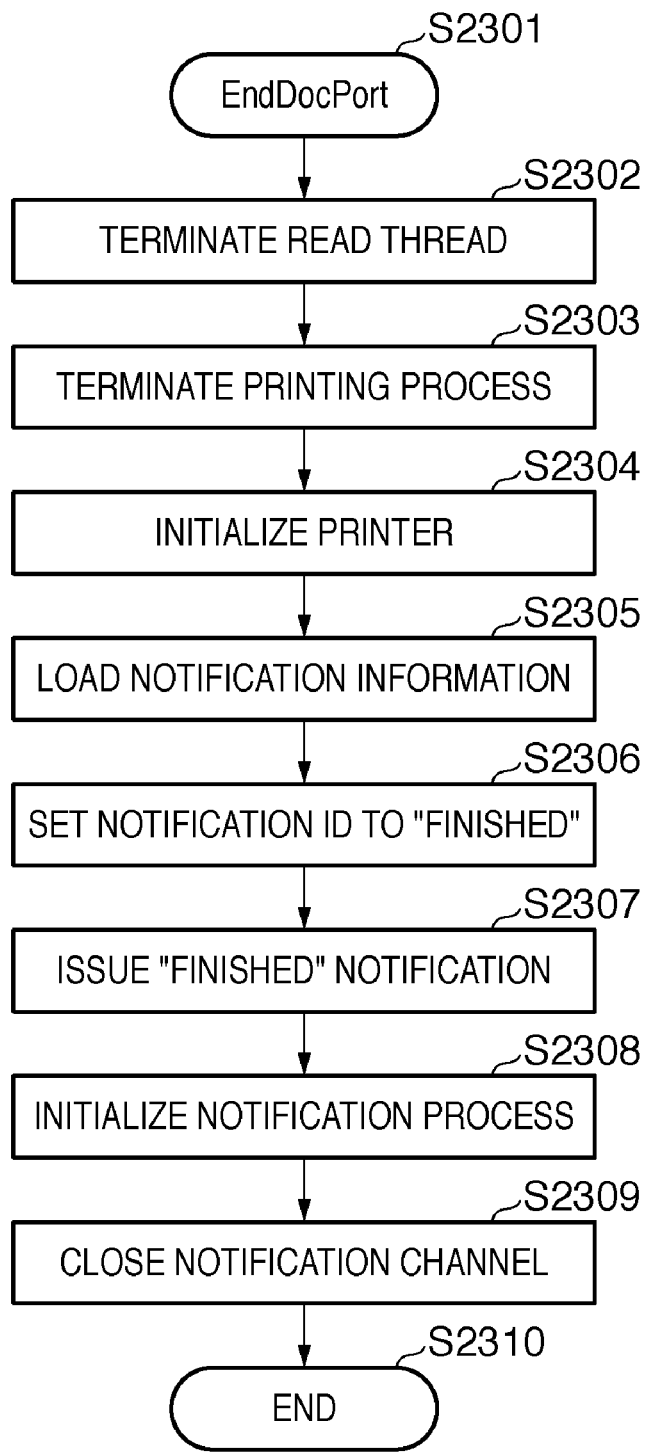
FIG. 23 is a flowchart of a conventional art indicating processing of an EndDocPort function in the LM 36.

FIG. 23 is a flowchart of a conventional art indicating the processing of the EndDocPort function in the LM 36. The processing set down in FIG. 23 is performed entirely by the LM 36. When this function is called from the spooler 40 (S2301), the LM 36 terminates the read thread (S2302), terminates the printing process (S2303), and initializes the printer 3 (S2304). The LM 36 then loads the job information (JobInfo) 100 (S2305), sets the notification ID (funcId) 103 to a value indicating "finished" (S2306), issues a "Finished" notification (S2307), and initializes the notification process (S2308). Initializing the notification process involves the LM 36 initializing the shared information 51. The LM 36 closes the notification channel for the notification function related to print jobs using the IPrintAsyncNotifyChannel::CloseChannel method (S2309), and returns to the spooler 40 after terminating the processing of the EndDocPort function (S2310).

WritePort Function of Present Embodiment

Figure 24:
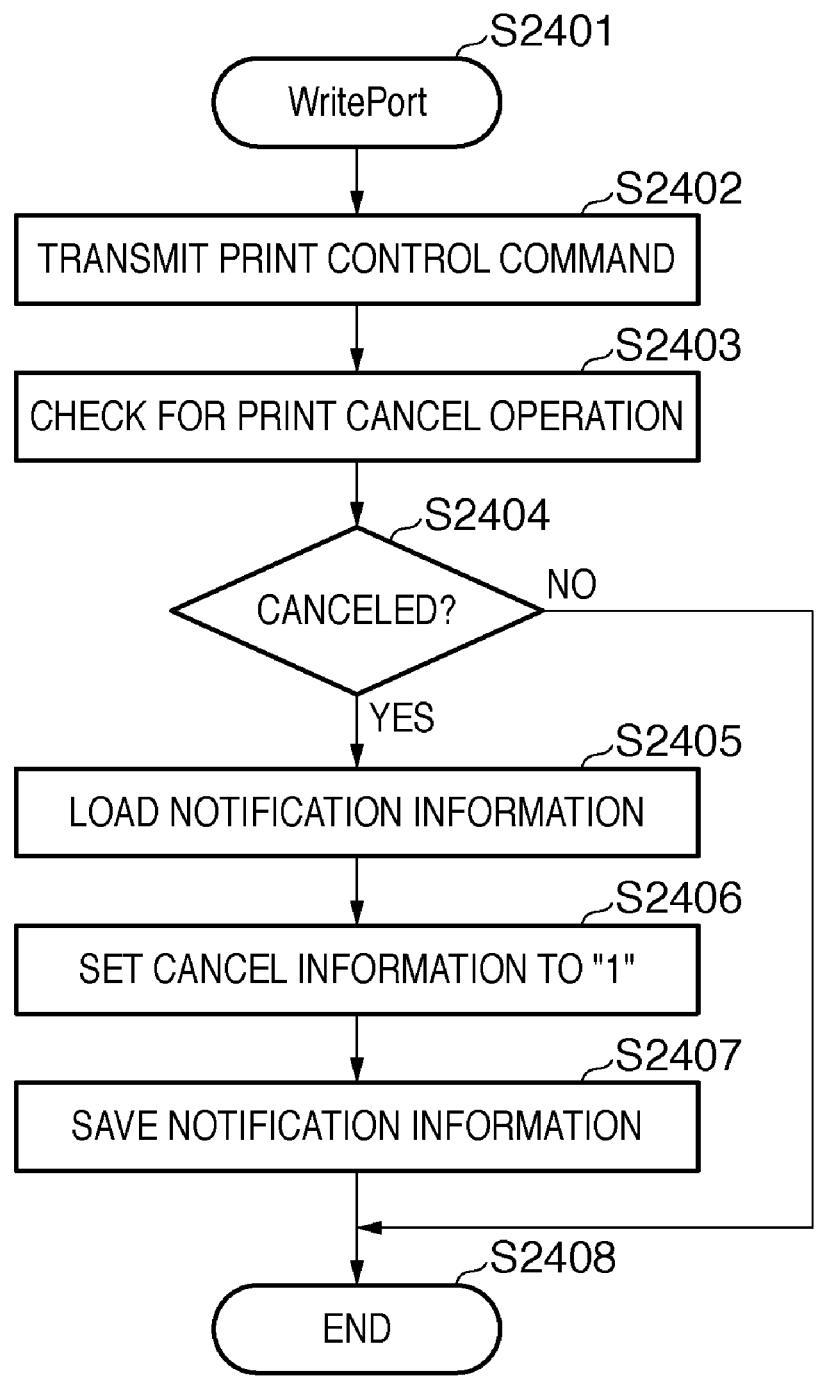
FIG. 24 is a flowchart indicating processing of a WritePort function in the LM 36.

FIG. 24 is a flowchart indicating processing of the WritePort function in the LM 36. The processing set down in FIG. 24 is performed entirely by the LM 36. When this function is called from the spooler 40 (S2401), the LM 36 transmits a print control command to the printer 3 (S2402), and determines whether the print cancel operation 67 has been performed by the operator (S2403). If the print job has been canceled (S2404), the LM 36 loads the job information (JobInfo) 100 (S2405), and sets the cancel information (canceled) 111 to "1" (S2406). The LM 36 saves this content to the job information (JobInfo) 100 in the shared information 51 (S2407), and returns to the spooler 40 after terminating the processing of the WritePort function (S2408). On the other hand, if in step S2404 the print job has not been canceled, the LM 36 returns to the spooler 40 after terminating the processing of the WritePort function (S2408).

Page Information Notification Process

Figure 25:
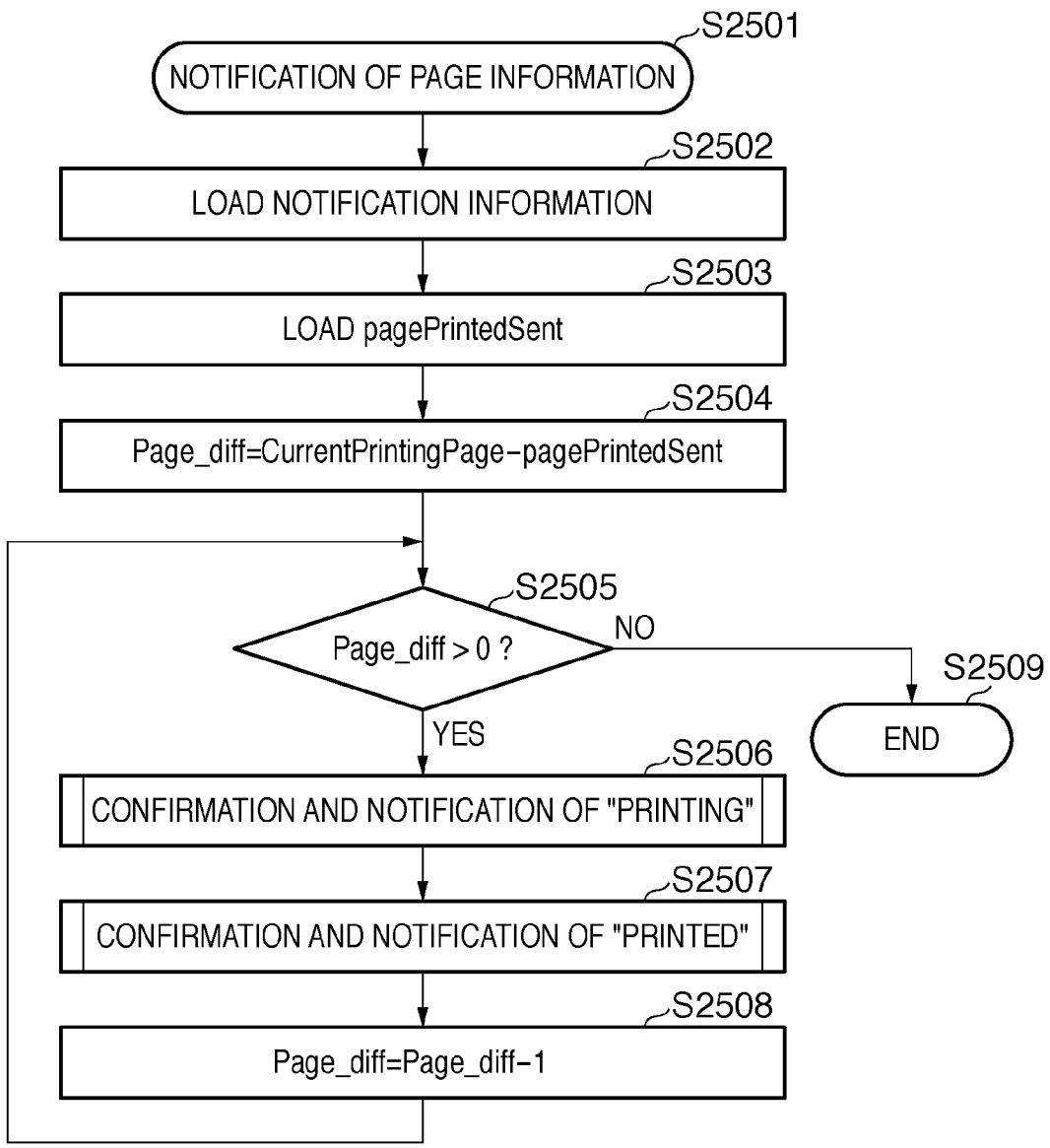
FIG. 25 is a flowchart indicating a process of notifying page information in the LM 36.

FIG. 25 is a flowchart indicating the process of notifying page information in the LM 36. The processing set down in FIG. 25 is performed entirely by the LM 36. This process is called when step S2104 in FIG. 21 is executed. When the process of notifying page information is started (S2501), the LM 36 loads the job information (JobInfo) 100 from the shared information 51 (S2502), and loads pagePrintedSent 123 (S2503). The difference between CurrentPrintingPage 121 and pagePrintedSent 123 is assigned to Page_diff (S2504). Next, the LM 36 determines whether Page_diff is greater than 0 (S2505). Page_diff is the difference between the current printing page number and the printed page number last notified by a "Printed" notification. If the value is greater than 0, there possibly exists a page number with respect to which "Printing" has not been notified by a "Printing" notification, or a page number with respect to which "Printed" has not been notified by a "Printed" notification. As such, if Page_diff is greater than 0, that is, if Page_diff is greater than or equal to 1 in terms of the values Page_diff can take in the present embodiment, the LM 36 executes the process of confirming and notifying "Printing" shown in FIG. 26 (S2506). The LM 36 also executes the process of confirming and notifying "Printed" (S2506) shown in FIG. 27 (S2507). As a result of S2506, the LM 36 issues a "Printing" notification for the page following the page number with respect to which a "Printing" notification was last issued (limited to a page number with respect to which a "Printing" notification has not been issued despite printing having started). Also, as a result of S2507, the LM 36 issues a "Printed" notification for the page following the page number with respect to which a "Printed" notification was last issued (limited to a page number with respect to which a "Printed" notification has not been issued despite printing having been completed). When these processes have ended, the LM 36 sets Page_diff to a value obtained by subtracting "1" from Page_diff (S2508), and returns to step S2505. If, in step S2505, Page_diff is less than or equal to 0, that is, if Page_diff is 0 in terms of the values Page_diff can take in the present embodiment, the LM 36 returns to the caller after terminating the process of notifying page information (S2509).

Process of Confirming and Notifying "Printing"

Figure 26:
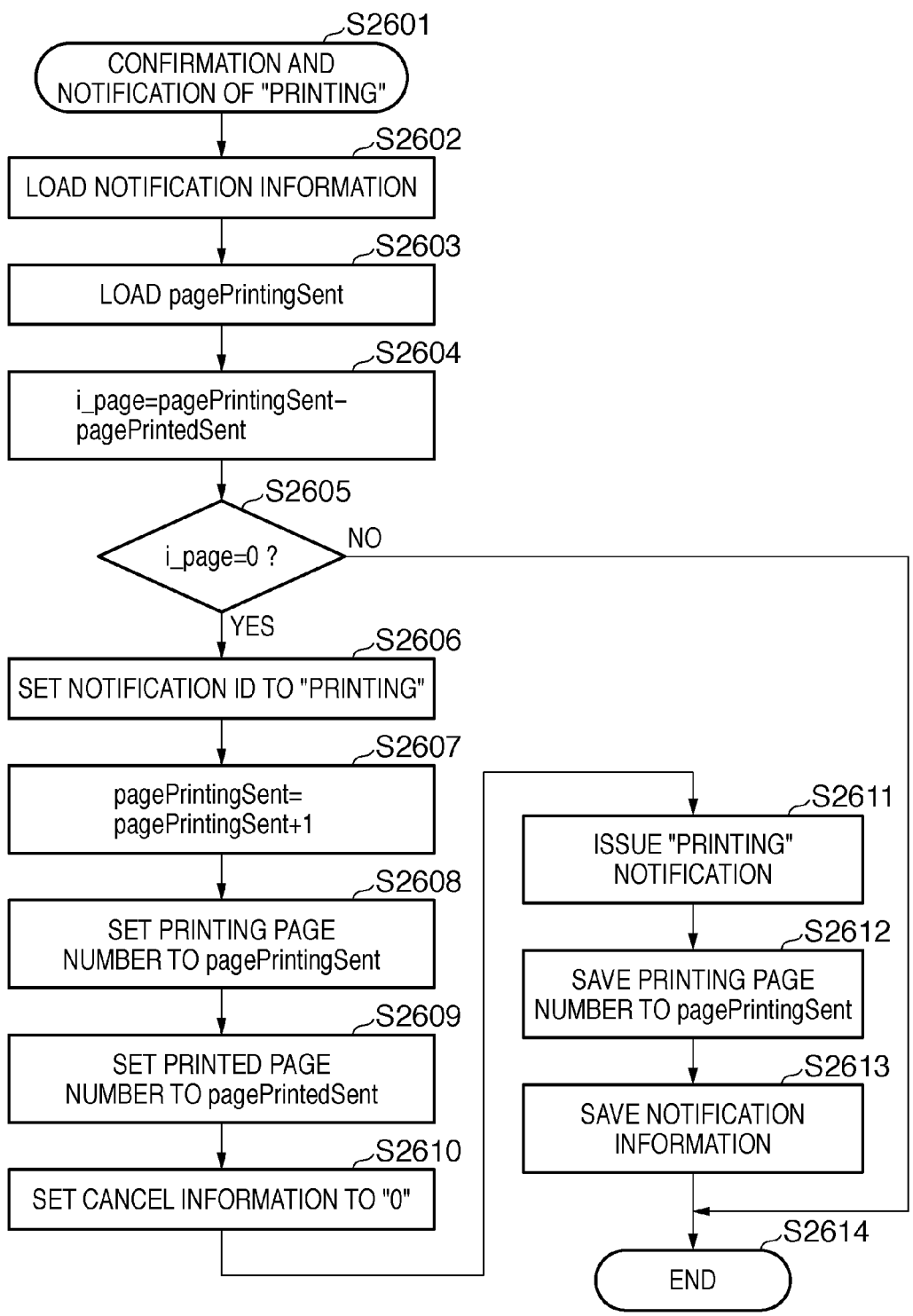
FIG. 26 is a flowchart indicating a process of confirming and notifying "Printing" in the LM 36.

FIG. 26 is a flowchart indicating the process of confirming and notifying "Printing" in the LM 36. The processing set down in FIG. 26 is performed entirely by the LM 36. This process is called when step S2506 in FIG. 25 is executed. When the process of confirming and notifying "Printing" is started (S2601), the LM 36 loads the job information (JobInfo) 100 from the shared information 51 (S2602), and loads pagePrintingSent 122 (S2603). The LM 36 assigns the difference between pagePrintingSent 122 and pagePrintedSent 123 to i_page (S2604). PagePrintingSent 122 is the printing page number last notified by a "Printing" notification. PagePrintedSent 123 is the printed page number last notified by a "Printed" notification. i_page will be either 0 or 1, because the normal order is such that after "Printed" has been issued for one page, "Printing" is then issued for the next page. If i_page is 0, "Printing" needs to be issued for the page following the printed page number notified by "Printed".

As such, the LM 36 determines whether i_page is 0 (S2605). If i_page is 0, the LM 36 sets a value indicating "printing" in the notification ID (funcId) 103 (S2606), and add 1 to pagePrintingSent 122, which is the printing page number last notified by a "Printing" notification (S2607). The LM 36 sets the printing page number (pagePrinting) 108 to pagePrintingSent 122 (S2608), and sets the printed page number (pagePrinted) 109 to pagePrintedSent 123 (S2609). The LM 36 sets the cancel information (canceled) 111 to "0" (S2610), and issues a "Printing" notification (S2611). In the "Printing" notification, the page number shown by pagePrinting 108 is set as the printing page number. The LM 36 saves the printing page number (pagePrinting) 108 to pagePrintingSent 122 (S2612). The LM 36 saves the content notified by the "Printing" notification to the job information (JobInfo) 100 in the shared information 51 (S2613), and returns to the caller after terminating the process of confirming and notifying "Printing" (S2614). The LM 36 thereby issues a "Printing" notification for the page following the page number with respect to which a "Printing" notification was last issued (limited to a page number with respect to which a "Printing" notification has not been issued).

On the other hand, if in step S2605 i_page is other than 0, that is, if i_page is greater than or equal to 1 in terms of the values i_page can take in the present embodiment, the LM 36 returns to the caller after terminating the process of confirming and notifying "Printing" (S2614). Even if the print cancel operation 67 arises in FIG. 13, and the cancel information (canceled) 111 is set to "1", the LM 36 sets the cancel information (canceled) 111 to "0" in step S2610. The "Printing" notification is thus issued with the cancel information (canceled) 111 in the job information (JobInfo) 100 included in the "Printing" notification set to the correct value, that is, "0". This is one of the characteristics of the invention according to the present embodiment.

Process of Confirming and Notifying "Printed"

Figure 27:
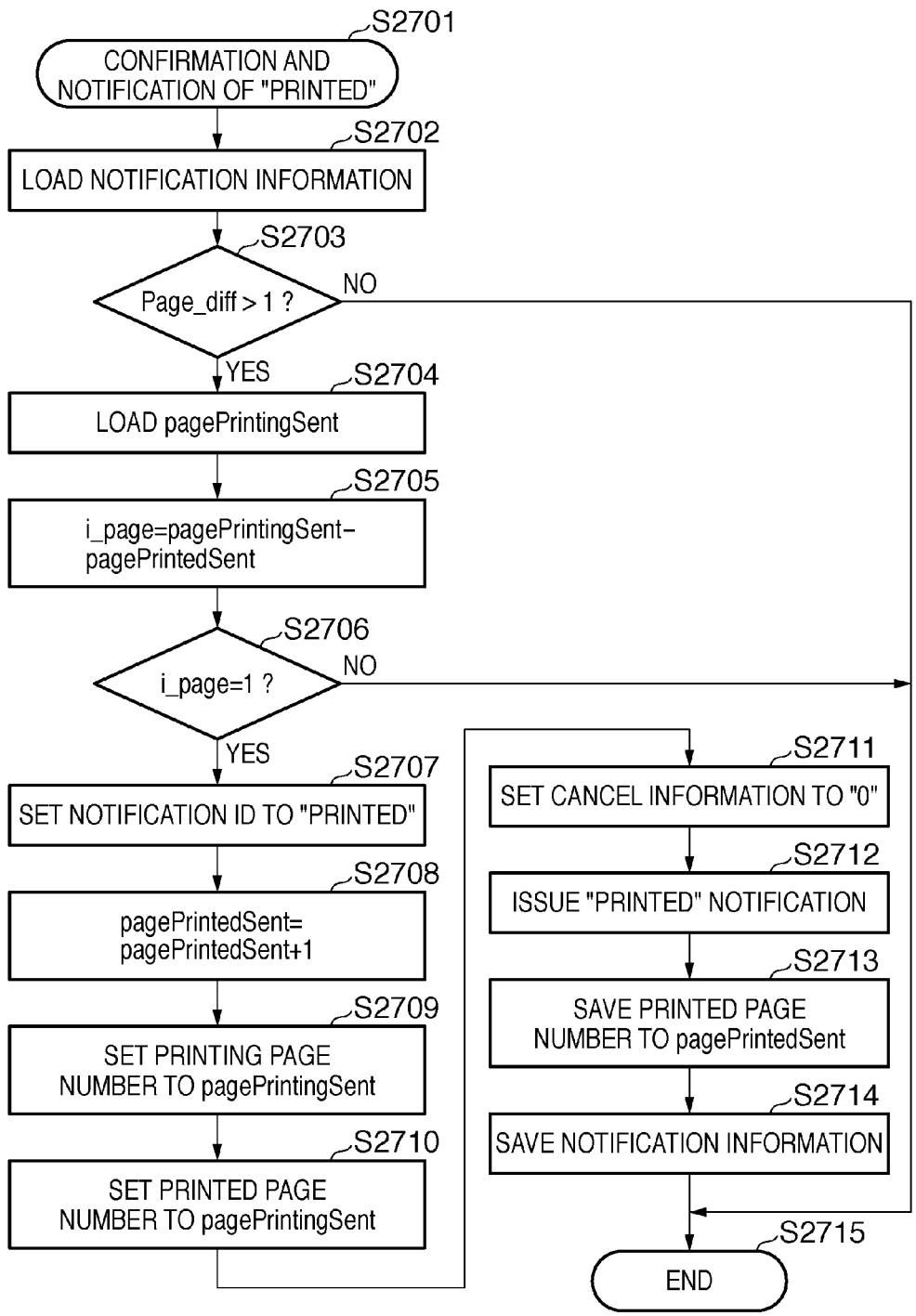
FIG. 27 is a flowchart indicating a process of confirming and notifying "Printed" in the LM 36.

FIG. 27 is a flowchart indicating the process of confirming and notifying "Printed" in the LM 36. The processing set down in FIG. 27 is performed entirely by the LM 36. This process is called when step S2507 in FIG. 25 is executed. When the process of confirming and notifying "Printed" is started (S2701), the LM 36 loads the job information (JobInfo) 100 from the shared information 51 (S2702), and determines if Page_diff is greater than 1 (S2703). If Page_diff is 1, a "Printed" notification for the page prior to the page currently being printed has been issued. As such, if Page_diff is greater than 1, that is, if Page_diff is greater than or equal to 2 in terms of the values Page_diff can take in the present embodiment (S2703), the LM 36 loads pagePrintingSent 122 (S2704). The LM 36 assigns the difference between pagePrintingSent 122 and pagePrintedSent 123 to i_page (S2705). Here, i_page is similar to in FIG. 26. That is, i_page will be either 0 or 1, because the normal order is such that after "Printed" has been issued for one page, "Printing" is then issued for the next page. If i_page is 1, "Printed" needs to be issued for the page following the printed page number already notified by a "Printed" notification.

As such, the LM 36 determines whether i_page is 1 (S2706). If i_page is 1, the LM 36 sets a value indicating "printed" in the notification ID (funcId) 103 (S2707), and assigns a value obtained by adding 1 to pagePrintedSent 123 to pagePrintedSent 123 (S2708). The LM 36 sets the printing page number (pagePrinting) 108 to pagePrintingSent 122 (S2709), and sets the printed page number (pagePrinted) 109 to pagePrintedSent 123 (S2710). The LM 36 sets the cancel information (canceled) 111 to "0" (S2711), and issues a "Printed" notification (S2712). The LM 36 saves the printed page number (pagePrinted) 109 to pagePrintedSent 123 (S2713), and saves the content notified by the "Printed" notification to the job information (JobInfo) 100 in the shared information 51 (S2714). The LM 36 then returns to the caller after terminating the process of confirming and notifying "Printed" (S2715). The LM 36 thereby issues a "Printed" notification for the page following the page number with respect to which a "Printed" notification was last issued (limited to a page number with respect to which a "Printed" notification has not been issued).

On the other hand, if in step S2706 i_page is other than 1, that is, if i_page is 0 or greater than or equal to 2 in terms of the values i_page can take in the present embodiment, the LM 36 returns to the caller after terminating the process of confirming and notifying "Printed" (S2715). If, in step S2703, Page_diff is less than or equal to 1, that is, if Page_diff is 0 or 1 in terms of the values Page_diff can take in the present embodiment, the LM 36 returns to the caller after terminating the process of confirming and notifying "Printed" (S2715).

Even if the print cancel operation 67 arises in FIG. 13, and the cancel information (canceled) 111 is set to "1", the LM 36 sets the cancel information (canceled) 111 to "0" in step S2711. The "Printed" notification is thus issued with the cancel information (canceled) 111 in the job information (JobInfo) 100 included in the "Printed" notification set to the correct value, that is, "0". This is one of the characteristics of the invention according to the present embodiment.

In FIG. 25 to 27, the LM 36 determines whether there are any pages with respect to which a "Printing" notification or a "Printed" notification has not yet been issued. If there are such pages, a "Printing" notification or a "Printed" notification is issued in the stated order for each corresponding page. A "Printed" notification is not issued, however, if the page is currently being printed.

EndDocPort Function of Present Embodiment

Figure 28:
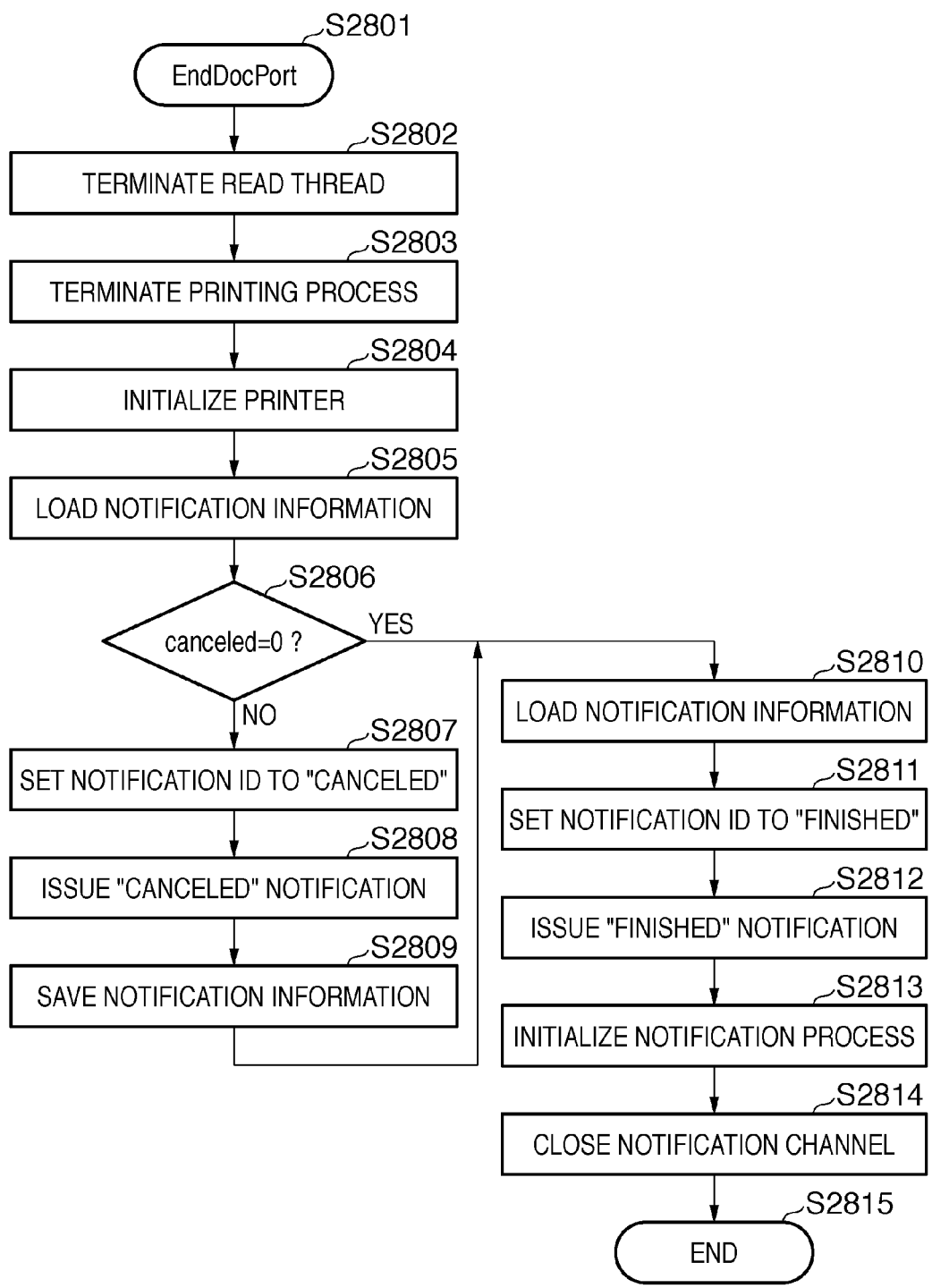
FIG. 28 is a flowchart indicating processing of an EndDocPort function in the LM 36.

FIG. 28 is a flowchart indicating processing of the EndDocPort function in the LM 36. The processing set down in FIG. 28 is performed entirely by the LM 36. When this function is called from the spooler 40 (S2801), the LM 36 terminates the read thread (S2802), terminates the printing process (S2803), and initializes the printer 3 (S2804). The LM 36 then loads the job information (JobInfo) 100 (S2805), and determines whether the cancel information (canceled) 111 is "0" (S2806). If other than "0", the LM 36 sets the notification ID (funcId) 103 to a value indicating "canceled" (S2807). The LM 36 then issues a "Canceled" notification (S2808), and saves the content notified by the "Canceled" notification to the job information (JobInfo) 100 in the shared information 51 (S2809). The LM 36 loads the job information (JobInfo) 100 (S2810), sets the notification ID (funcId) 103 to a value indicating "finished" (S2811), issues a "Finished" notification (S2812), and initializes the notification process (S2813). Initializing the notification process involves the LM 36 initializing the shared information 51. The LM 36 closes the notification channel for the notification function related to print jobs using the IPrintAsyncNotifyChannel::CloseChannel method in the OS (S2814), and returns to the spooler 40 after terminating the processing of the EndDocPort function (S2815). If in step S2806 the cancel information (canceled) 111 is "0", the LM 36 proceeds to step S2810. A "Canceled" notification is thereby issued in step S2808 of the EndDocPort function. "Printing" and "Printed" notifications related to all pages with respect to which printing has already been started or finished can thus be issued with the correct content, even when the print job is canceled by the operator. This is one of the characteristics of the invention according to the present embodiment.

Notification Receiving Process in Application 30

Figure 29:
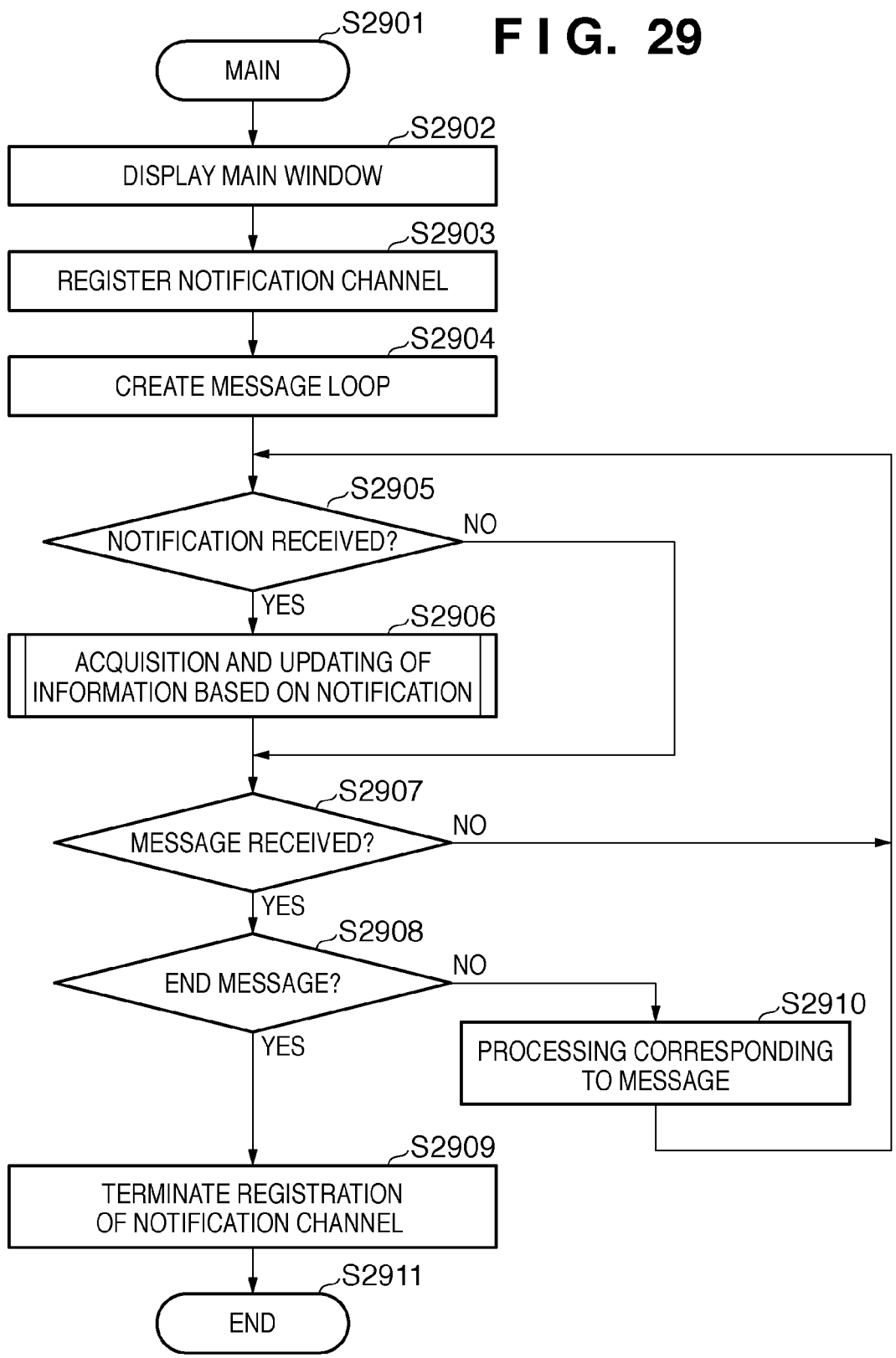
FIG. 29 is a flowchart indicating a main process in an application 30.
Figure 30:
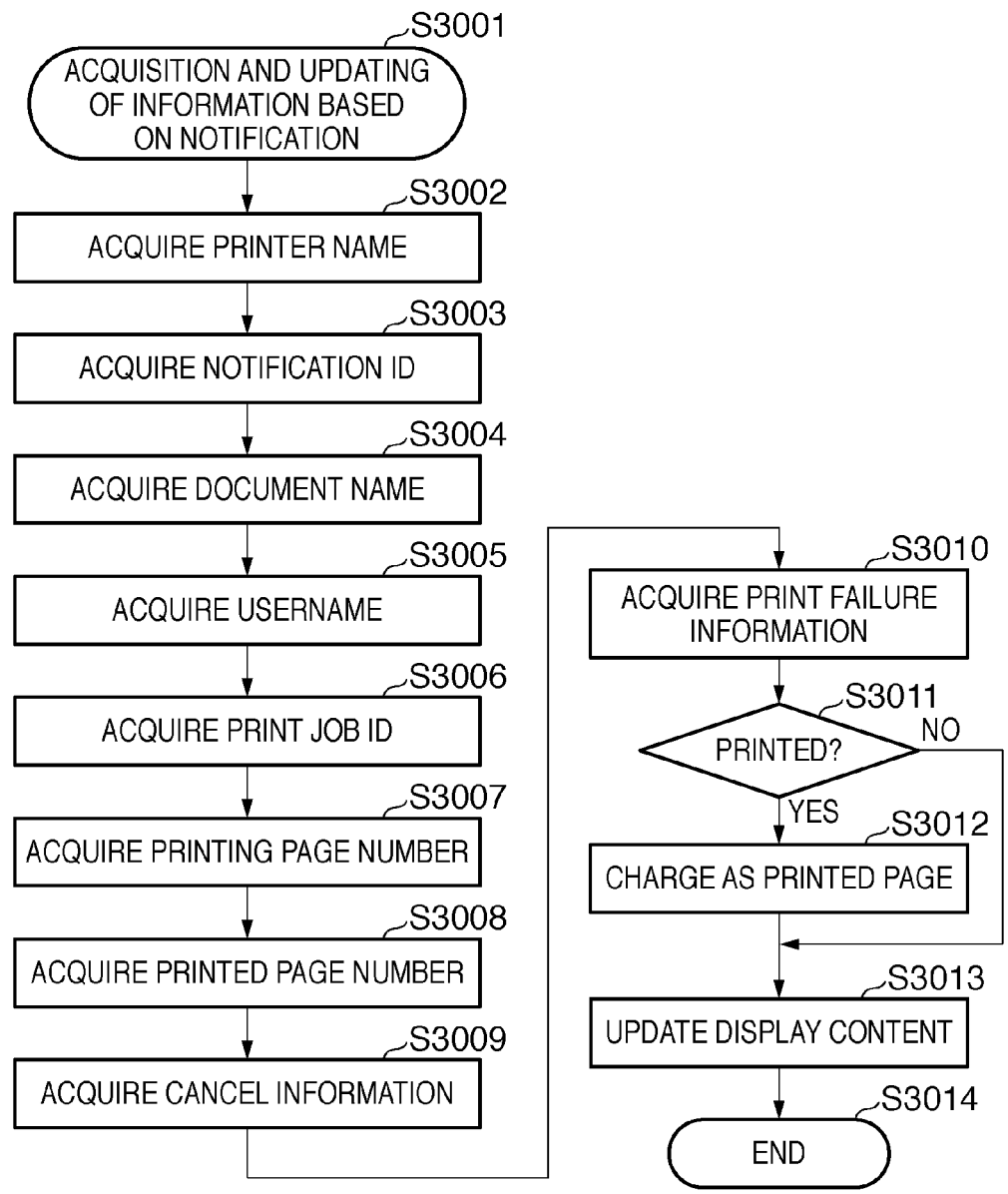
FIG. 30 is a flowchart indicating a process of acquiring and updating information based on a notification in the application 30.

FIG. 29 is a flowchart indicating a main process in the application 30. The processing set down in FIG. 29 is performed entirely by the application 30. When the application 30 is started by an operator operation or the like (S2901), the application 30 displays the main window 42 (S2902). The application 30 registers a notification channel for the notification function related to print jobs by calling a RegisterForPrintAsyncNotifications function in the OS (S2903). Registering a notification channel enables the application 30 to receive notifications related to a print job issued by the LM 36. The application 30 creates a message loop (S2904). This message loop enables the application 30 to receive messages such as keyboard and mouse operation event messages from the operator and event messages related to window and application controls from the OS, and to perform appropriate processing on respective messages. If a notification related to a print job is received (S2905), the application 30 executes acquisition and updating of information based on a notification as shown in FIGS. 30 and 34 (S2906). If a message has been received (S2907), and the received message is an application end message (S2908), the application 30 calls an UnRegisterForPrintAsyncNotifications function in the OS. The application 30 thus terminates registration of the notification channel for the notification function related to print jobs (S2909), and the application 30 is ended (S2911). If the received message is other than an application end message in step S2908, the application 30 performs appropriate processing corresponding to the message (S2910), and returns to step S2905. Note that a detailed description of appropriate processing corresponding to a message is omitted here. If in step S2907 a message has not been received, the application 30 returns to step S2905. If in step S2905 a notification related to a print job has not been received, the application 30 proceeds to step S2907.

FIG. 30 is a flowchart indicating a process of acquiring and updating information based on a notification in the application 30. The processing set down in FIG. 30 is performed entirely by the application 30. This process is called when step S2906 in FIG. 29 is executed. When the process of acquiring and updating information based on a notification is started (S3001), the application 30 acquires the following information from the job information (JobInfo) 100 included in the notification:

printer name (printer) 104 (S3002)
    notification ID (funcId) 103 (S3003)
    document name (document) 107 (S3004)
    username (user) 105 (S3005)
    print job ID (jobId) 106 (S3006)
    printing page number (pagePrinting) 108 (S3007)
    printed page number (pagePrinted) 109 (S3008)
    cancel information (canceled) 111 (S3009)
    print failure information (failedPrint) 112 (S3010)

If the notification ID (funcId) 103 is a value indicating "printed" (S3011), the application 30 charges for the page indicated by the printed page number (pagePrinted) 109 (S3012) as a printed page. The application 30 updates the display content of the printer display portion 43, the print job information display portion 44 and the print status display portion 45 (S3013), and returns to the caller after terminating the process of acquiring and updating information based on a notification (S3014). If in step S3011 the notification ID (funcId) 103 is other than a value indicating "printed", the application 30 proceeds to step S3013.

With the peripheral device control system of the present invention, exclusive controls are realized by dividing up the notification process related to a print job in the write tread and the read thread as follows, enabling the LM 36 to accurately issue notifications related to a print job. That is, the "Start", "Finished" and "Canceled" notifications are processed in the write thread, while the "Printing" and "Printed" notifications are processed in the read thread. This is one of the characteristics of the invention according to the present embodiment.

In the present embodiment, "Printing" (i.e., start of printing of the page) and "Printed" (i.e., end of printing of the page) notifications for a page targeted for printing can thus be issued without exception. Also, "Printing" and "Printed" notifications can be issued with the correct content and in the correct order, even if printing is canceled part way through. That is, the notification information is notified after being compensated as necessary. In the present embodiment, peripheral device information is acquired at a given time interval from a peripheral device, notification information is generated from first peripheral device information of a certain time and second peripheral device information of a different time, and the notification information is notified to an information processing apparatus.

Second Embodiment

In the peripheral device control system set down in the first embodiment, processing in the OS or the communication conditions of the network 4 affect the notifications if they are issued at short intervals by the LM 36. Therefore, the application 30 may receive notifications in a different order to the order in which they were issued by the LM 36, resulting in inconsistency in the order of notifications. An exemplary means for resolving such inconsistency in the order of notifications will now be set down.

Figure 15:
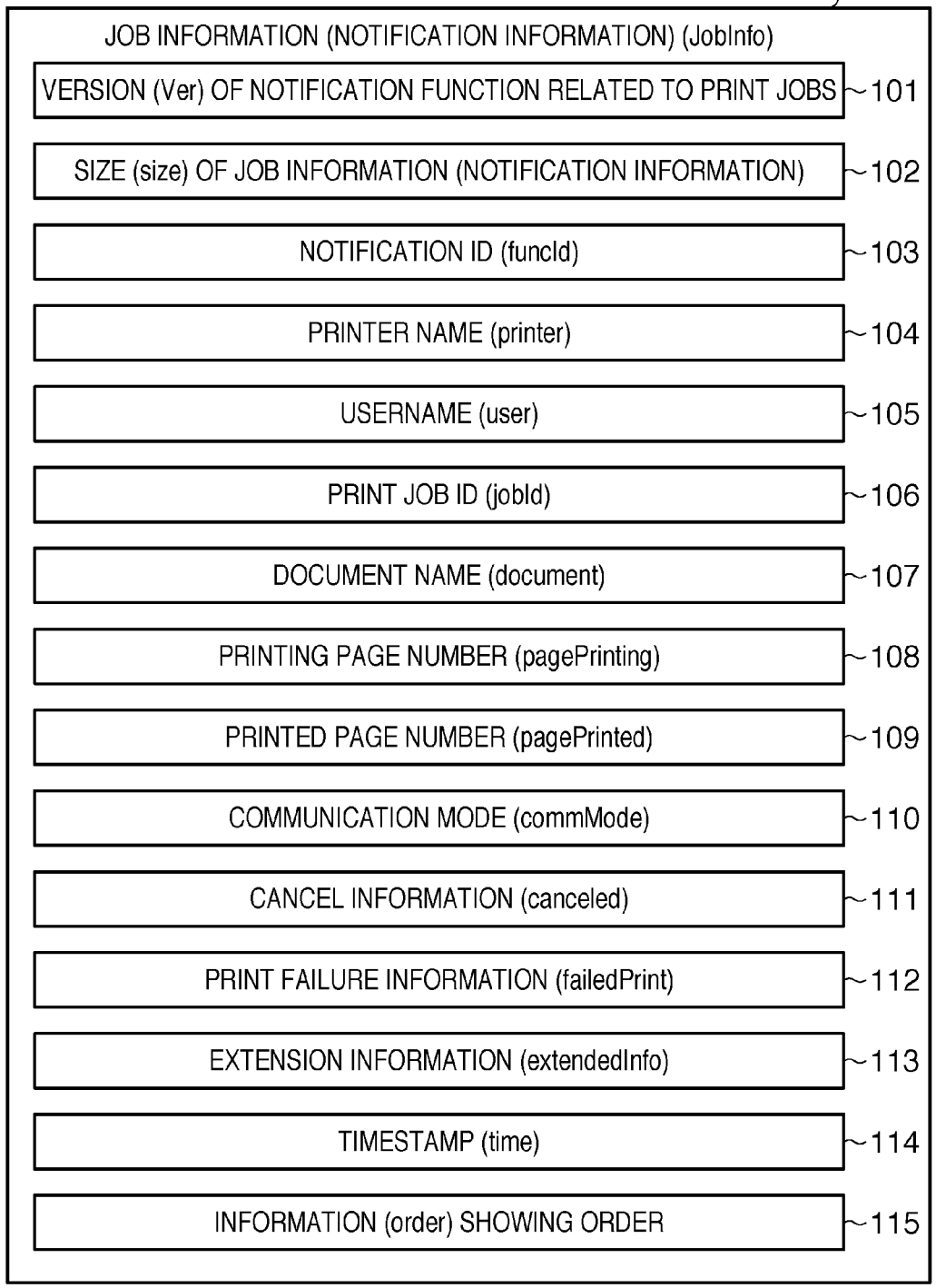
FIG. 15 indicates job information (JobInfo).

FIG. 15 indicates the job information (JobInfo) of the present embodiment. Description of content in FIG. 15 that overlaps with FIG. 5 is omitted here. A timestamp (time) 114 indicates the issuance time of a notification related to a print job. Order information (order) 115 is appended in order to each notification, and shows the order of notifications related to a print job.

FIG. 16 indicates the content of notifications related to a print job. In FIG. 16, the content of the job information (JobInfo) 100 of notifications related to a print job issued by the LM 36 are set down. The content of the job information (JobInfo) 100 of the notifications are set down in the order in which the notifications were issued, from the top. The content of the job information (JobInfo) 100 is shown in FIG. 15. FIG. 16 indicates the content of notifications related to the print job issued in the example shown in the timing chart of FIG. 11.

Compared to FIG. 12, we see that the timestamp (time) 114 and the order information (order) 115 have been appended to each notification.

FIG. 17 indicates the content of notifications related to a print job. In FIG. 17, the content of the job information (JobInfo) 100 of notifications related to a print job received by the application 30 are described. The content of the job information (JobInfo) 100 is shown in FIG. 15. FIG. 17 indicates the content of notifications related to the print job issued by the LM 36 in the example shown in the timing chart of FIG. 11, when received by the application 30. FIG. 17 reveals that the order of the "Printing" notification 73 (JobInfo:73) of page 2 and "Printed" the notification 74 (JobInfo:74) of page 2 has been reversed, causing an inconsistency. This was because these notifications were affected by processing in the OS or the communication conditions of the network 4 as a result of being issued at a very short interval due to calculations such as shown in FIGS. 26 and 27.

Figure 32:
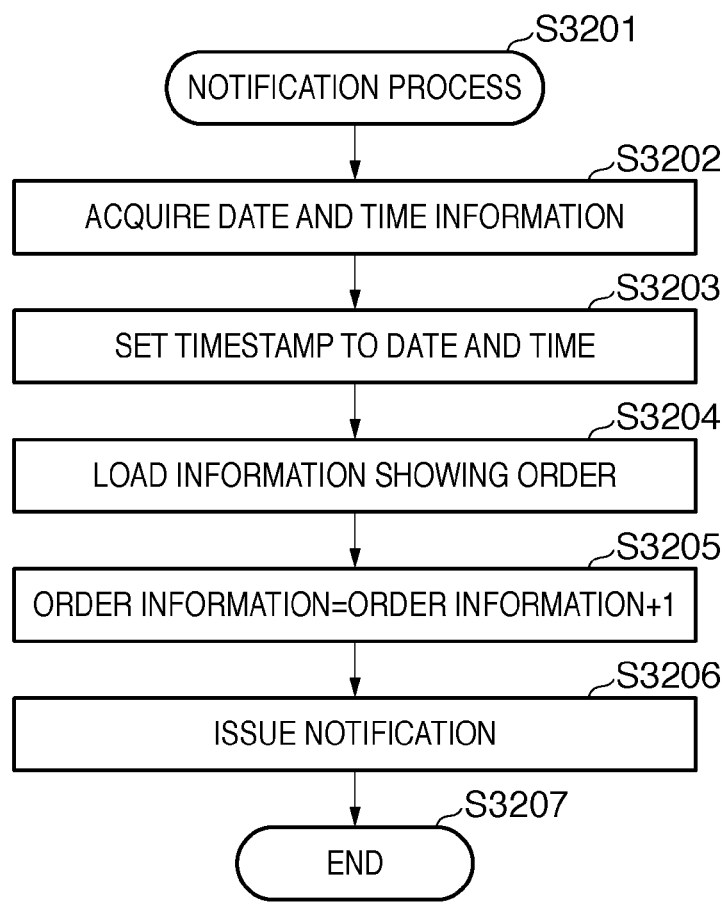
FIG. 32 is a flowchart indicating a notification process in the LM 36.

FIG. 32 is a flowchart indicating a notification process in the LM 36. The processing set down in FIG. 32 is performed entirely by the LM 36, and the problem of inconsistency can be resolved by the LM 36 executing the processing of FIG. 32 as part of the notification processes given below to append a timestamp and order information to the notification.

(1) Step S1908 in FIG. 19
(2) Step S2611 in FIG. 26
(3) Step S2712 in FIG. 27
(4) Steps S2808 and S2812 in FIG. 28

Firstly, when this process is started with respect to each of these notification processes (S3201), the LM 36 acquires date and time information from the OS (S3202), and sets the timestamp (time) 114 to the acquired date and time (S3203). The LM 36 then loads the order information (order) 115 (S3204), and assigns a value obtained by adding 1 to the order information (order) 115 to the order information (order) 115 (S3205). The LM 36 then issues the notification in the respective steps (S3206) and returns to the caller after ending the notification process (S3207).

FIG. 33 indicates a notification list. In FIG. 33, the notification list 49 is a list that allows the application 30 to perform accurate control by managing the information of received notifications related to a print job. The notification list 49 is saved in the RAM 1201 or the HDD 1202, which are storage areas usable by the application 30. In FIG. 33, notifications up to the "Printed" notification 74 (JobInfo:74) of page 2 have been received, out of the content of the notifications related to the print job shown in FIG. 17. The application 30 refers to the notification list, and treats, as valid, information in the rows in which the order information is saved sequentially. In the FIG. 33, for example, information in the rows of order information 1 to 3 is treated as valid information, whereas information in the rows of order information 4 not yet received and order information 5 already received is treated as invalid at this point.

Figure 34B:
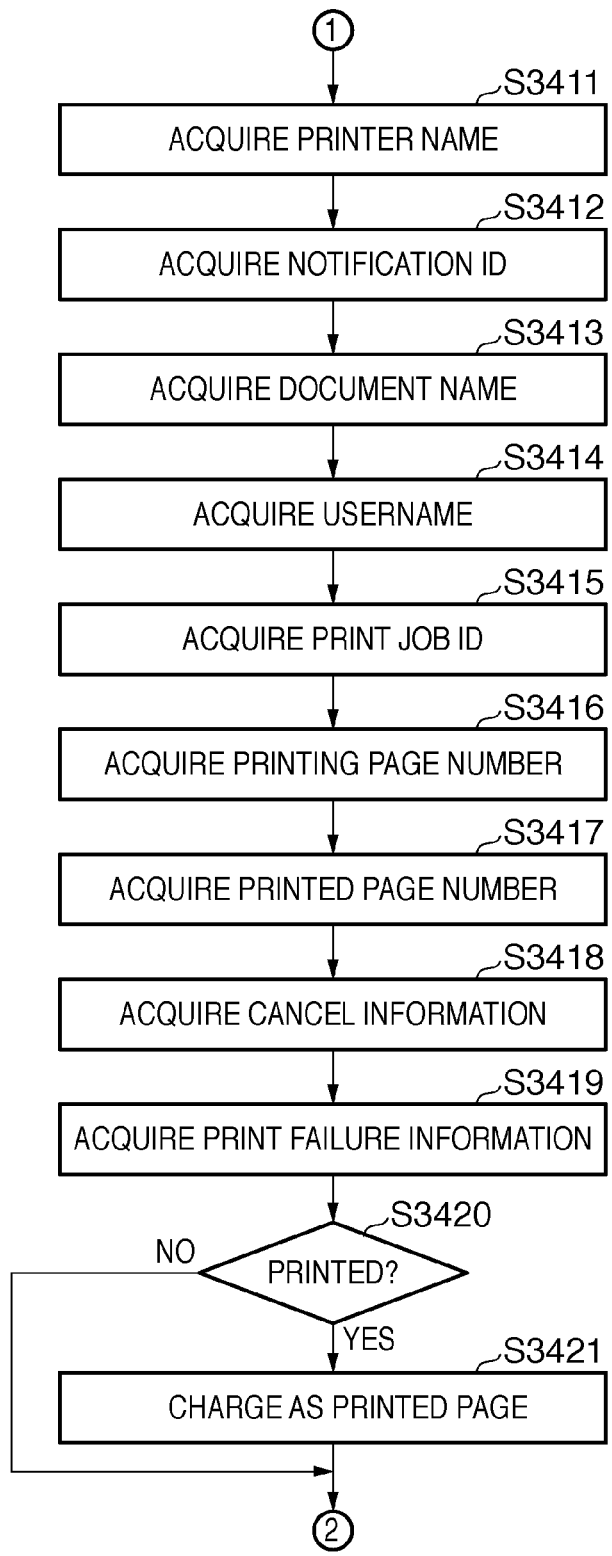

FIGS. 34A and 34B is a flowchart indicating a process of acquiring and updating information based on a notification in the application 30. The processing set down in FIGS. 34A and 34B is performed entirely by the application 30. When step S2906 in FIG. 29 is executed, a procedure shown in FIGS. 34A and 34B is called in the present embodiment, whereas FIG. 30 was executed in the first embodiment. When the process of acquiring and updating information based on a notification is started (S3401), the application 30 acquires the order information (order) 115 in the job information (JobInfo) 100 (S3402), and saves the acquired order information to the notification list 49 (S3403). The application 30 acquires the timestamp (time) 114 in the job information (JobInfo) 100 (S3404), and saves the acquired timestamp to the notification list 49 (S3405). The application 30 checks the order information (order) in the notification list 49 (S3406). Here, checking involves the application 30 determining whether there is an omission, with reference to the notification list 49. If there is a notification omission (S3407:YES), the application 30 returns to the caller after terminating the process of acquiring and updating information based on a notification (S3423). If, in step S3407, there is not a notification omission, the application 30 checks the timestamps (time) in the notification list 49 (S3408). Here, checking involves the application 30 determining whether there is an inconsistency in the timestamps, with reference to the notification list 49. If there is an inconsistency in the timestamps (S3409:YES), the application 30 displays an error indicating that the notification is incorrect in the Information field of the print status display portion 45 in FIG. 18 (S3410). This error reads "Information: Notification is incorrect." The application 30 then returns to the caller after terminating the process of acquiring and updating information based on a notification (S3423). Here, an inconsistency in the timestamps corresponds, for example, to the case where the timestamp (time) of a notification with higher order information (order) shows an earlier time than the timestamp (time) of a notification with lower order information (order) in the notification list 49. That is, an inconsistency in the timestamps refers to the case where the order shown by the order information is inconsistent with the order shown by the timestamps. Note that the notification list 49 shown in FIG. 33 only sets down the case where the notification process operates normally, and does not show the case of such an error. If, in step S3409, there is not an inconsistency in the timestamps, the application 30 acquires the following information from the job information (JobInfo) 100 saved in the notification list 49:

printer name (printer) 104 (S3411)
notification ID (funcId) 103 (S3412)
document name (document) 107 (S3413)
username (user) 105 (S3414)
print job ID (jobId) 106 (S3415)
printing page number (pagePrinting) 108 (S3416)
printed page number (pagePrinted) 109 (S3417)
cancel information (canceled) 111 (S3418)
print failure information (failedPrint) 112 (S3419)

The application 30 determines whether the notification ID (funcId) 103 in the job information (JobInfo) 100 is a value indicating "printed" (S3420). If this is the case, the application 30 charges for the page shown by the printed page number (pagePrinted) 109 in the job information (JobInfo) 100 as a printed page (S3421). The application 30 updates the display content of the printer display portion 43, the print job information display portion 44 and the print status display portion 45 (S3422), and returns to the caller after terminating the process of acquiring and updating information based on a notification (S3423). If, in step S3420, the notification ID (funcId) 103 is other than a value indicating "printed", the application 30 proceeds to step S3422. The problem of inconsistency can thereby be resolved by the application 30 checking the timestamps (time) or the information (order) indicating the order of the notifications using the notification list 49, and then appropriately processing the notifications issued by the LM 36 in the order in which they were issued. This is one of the characteristics of the invention according to the present embodiment. Note that in the present embodiment, timestamps (time) are used in error processing. The present invention is not limited to this example, and the problem of inconsistency in the order of the notifications can also be resolved by the application 30 appropriately processing the notifications issued by the LM 36 in the order in which they were issued, using timestamps (time). To appropriately process the notifications in order, the order of the notification information is rearranged in accordance with order information showing the order of the notifications, for example, and the notifications are processed in the rearranged order.

Third Embodiment

Figure 31:
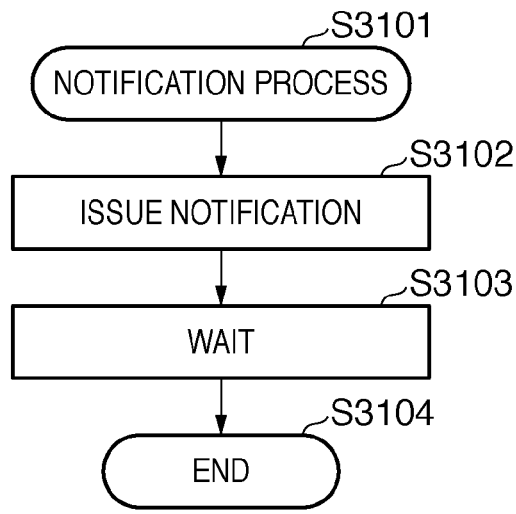
FIG. 31 is a flowchart indicating a notification process in the LM 36.

A further example of the means for resolving such an inconsistency in the order of the notifications in the peripheral device control system set down in the second embodiment will now be set down. FIG. 31 is a flowchart indicating a notification process in the LM 36. The processing set down in FIG. 31 is performed entirely by the LM 36, and the problem of inconsistency can be resolved by the LM 36 executing this processing as part of the notification processes given below.

(1) Step S1908 in FIG. 19
(2) Step S2611 in FIG. 26
(3) Step S2712 in FIG. 27
(4) Steps S2808 and S2812 in FIG. 28

When this process is started with respect to each of these notification processes (S3101), the LM 36 issues the notification in the respective steps (S3102), waits for a fixed period (1 sec in this example) (S3103), and returns to the caller after terminating the notification process (S3104). The application 30 is able to receive respective notifications in the same order as they were issued by the LM 36 as a result of the LM 36 waiting for a fixed period in step S3103, thereby enabling the problem of inconsistency to be resolved. The wait process in step S3103 is one of the characteristics of the invention according to the present embodiment.

In the present embodiment, subsequent notification information is not notified until at least a given period has elapsed after the previous notification information was notified.

Extensions of Invention According to Embodiments

The configuration of computer programs run in the foregoing three embodiments will now be described. The configuration of data processing programs readable in a peripheral device control system composed of an information processing apparatus and a peripheral device according to the present invention will be described with reference to the memory map shown in FIG. 38.

FIG. 38 shows a memory map of a storage medium storing various data processing programs readable in the peripheral device control system according to the present invention. Note that while not particularly illustrated, information for managing the group of programs stored on the storage medium, such as version information and creator information, for example, is also stored on the storage medium. Further, information dependent on the OS or the like of the device that reads the programs, such as icons identifying the programs, for example, may also be stored on the storage medium. In FIG. 38, the storage medium 130 is here assumed to be constituted by a hard disk. Data belonging to the various programs is managed in a directory information management portion 131. Programs for installing the various programs on the information processing apparatus and programs for decompressing programs for installing that are compressed may be stored in a program storage portion 132. Functions realizable as a result of executing the flowcharts shown respectively in FIGS. 19 to 32 and FIGS. 34A and 34B in the embodiments may be realized by the information processing apparatus, using programs installed from an external source. In this case, the present invention is applicable even in the case where an information group that includes computer programs is supplied to the information processing apparatus or the peripheral device using a storage medium such as CD-ROM, flash memory or flexible disk, or from an external storage medium via a network.

The present invention is also attained by supplying a storage medium storing program code for realizing the functions of the foregoing embodiments to a system or an apparatus, and reading out and executing the program code stored on the storage medium with a computer of the system or apparatus. In this case, the actual program code read out from the storage medium realizes the functions of the foregoing embodiments, and the actual program code and the storage medium storing the program code constitute the present invention. Storage media that can be used for supplying the program code include, for example, flexible disk, hard disk, optical disk, magneto-optical disk, CD-ROM, CD-R, magnetic tape, nonvolatile memory card, ROM, and EEPROM.

The present invention also covers the case where an operating system (OS) or the like running on a computer performs part or all of the actual processing based on instructions in the program code, with the functions of the foregoing embodiments being realized by this processing. Further, the present invention is also applicable in the case where the program code read out from the storage medium is written to a memory provided in a function expansion card inserted in a computer or a function expansion unit connected to a computer. In this case, a CPU or the like provided in the function expansion card or the function expansion unit performs part or all of the actual processing based on instructions in the written program code, with the functions of the foregoing embodiments being realized by this processing.

The embodiments of the present invention were described focusing on an exemplary local printing system as an example of a peripheral device control system. However, the present invention is not limited to this example, and is also realizable and effective in the case where, for example, the application 47 in the PC 2 is used instead of the application 30 in the PC 1, in a network printing system such as shown in FIG. 1.

In the embodiments, a billing application (Photo Album Creator) such as shown in FIG. 18 was given as an example of the applications 30 and 47, although the present invention is not limited to this example. The present invention is realizable and effective with an arbitrary application that acquires information from a peripheral device and uses the acquired information to perform notifications related that information, for example.

In the embodiments of the present invention, an example was described in which the applications 30 and 47 receive notifications related to a print job printed by the printer 3, although the present invention is not limited to this example, and can be effectively utilized in relation to a peripheral device control system that acquires and notifies arbitrary information and status information.

In the embodiments of the present invention, the present invention is realized using a notification function via Asynchronous Printing Notification Interfaces implemented in the Windows Vista (registered trademark) OS. However, the present invention is not limited to this example, and can be realized using an arbitrary notification function. Also, a more general-purpose system can easily be realized by using standardized specifications to realize the present invention.

While a color inkjet printer was used as an exemplary printer in the embodiments of the present invention, the present invention is not limited to this example and can use an arbitrary printer such as a monochrome LBP, for example.

In the embodiments of the present invention, personal computers were envisaged as a client and a server. However, the present invention is not limited to this example, and is realizable and effective with respect to arbitrary terminals capable of similar usage, such as DVD video players, games, set-top boxes and Internet appliances, for example.

In the embodiments of the present invention, a printer was illustrated as a peripheral device. However, any of a copier, a facsimile, a scanner, a digital camera, or a device provided with these multiple functions fall within the applicable scope of the present invention.

While Windows Vista (registered trademark) was used as an exemplary OS in the embodiments of the present invention, the present invention is not limited to this OS, and can use an arbitrary OS.

While Ethernet was used as an exemplary configuration of the network 4 in the embodiments of the present invention, the present invention is not limited to this example, and may use another arbitrary network configuration.

In the embodiments of the present invention, a USB interface was used as the interface between the PC1 and the printer 3. The present invention is not limited to this interface, and may use an arbitrary interface such as Ethernet, wireless LAN, IEEE1394, Bluetooth, IrDA, or a parallel or serial interface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-159496, filed Jun. 15, 2007 which is hereby incorporated by reference herein in its entirety.

What is claimed is:

1. A peripheral device control system comprising a first information processing apparatus and a printing device, wherein
the first information processing apparatus includes:
an acquisition unit that acquires peripheral device information indicating a progress state of a print job from the printing device,
a notification information generation unit that generates notification information containing the progress state of the print job based on the peripheral device information, and
a notification unit that notifies the notification information, and
wherein the acquisition unit acquires the peripheral device information from the printing device at a given time interval, the notification information generation unit generates notification information indicating a change of the progress state of the print job in units of pages based on first peripheral device information indicating the progress state of the print job in units of pages at a certain time and second peripheral device information indicating that the print job has been canceled at a later time.

2. The peripheral device control system according to claim 1, further comprising a second information processing apparatus, wherein
the notification unit notifies the notification information to the second information processing apparatus.

3. The peripheral device control system according to claim 1, wherein
the first information processing apparatus further includes a peripheral device control unit that controls the peripheral device, and
the peripheral device control unit acquires the peripheral device information, generates notification information from the peripheral device information, and notifies the notification information.

4. The peripheral device control system according to claim 1, wherein said generation unit generates the notification information including interpolated notification information indicating the progress state between said certain time and said later time.

5. The peripheral device control system according to claim 3, wherein the peripheral device control unit controls the peripheral device using a write thread for controlling data writing to the peripheral device and a read thread for controlling data reading from the peripheral device, and includes an information sharing unit that shares information between the write thread and the read thread.

6. The peripheral device control system according to claim 5, wherein the peripheral device control unit generates the notification information from the peripheral device information and shared information shared by the information sharing unit.

7. The peripheral device control system according to claim 6, wherein the peripheral device control unit notifies the notification information generated from the shared information after changing part thereof according to a type of the notification information.

8. The peripheral device control system according to claim 5, wherein
the notification information is constituted by a plurality of types, and
the peripheral device control unit classifies the notification information into a first notification information group and a second notification information group, notifies notification information included in the first notification information group from the write thread, and notifies notification information included in the second notification information group from the read thread.

9. The peripheral device control system according to claim 1, wherein the notification information is provided with a dependency relation.

10. The peripheral device control system according to claim 1, wherein the notification unit notifies certain notification information, and then, after a given time period has elapsed, notifies subsequent notification information.

11. The peripheral device control system according to claim 1, wherein the notification information includes time information indicating a time.

12. The peripheral device control system according to claim 1, wherein the notification information includes order information indicating an order of notification.

13. The peripheral device control system according to claim 2, wherein
the notification information includes time information indicating a time,
the first information processing apparatus or the second information processing apparatus includes an application capable of receiving the notification information, and
the application rearranges an order of the notification information in accordance with the time information.

14. The peripheral device control system according to claim 2, wherein
the notification information includes order information indicating an order of notification, the first information processing apparatus or the second information processing apparatus includes an application capable of receiving the notification information, and the application rearranges an order of the notification information in accordance with the order information.

15. An information processing apparatus comprising:
an acquisition unit that acquires peripheral device information indicating a progress state of a print job from the printing device;
a notification information generation unit that generates notification information containing the progress state of the print job based on the peripheral device information; and
a notification unit that notifies the notification information, wherein
the acquisition unit acquires the peripheral device information from the printing device at a given time interval,
the notification information generation unit generates notification information indicating a change of the progress state of the print job in units of pages based on first peripheral device information indicating the progress state of the print job in units of pages at a certain time and second peripheral device information indicating that the print job has been canceled at a later time.

16. An information processing apparatus connected to a printing device, comprising:
an acquisition unit that acquires peripheral device information indicating a progress state of a print job from the printing device;
a notification information generation unit that generates notification information containing the progress state of the print job based on the peripheral device information; and
a notification unit that notifies the notification information to a second information processing apparatus, wherein
the acquisition unit acquires the peripheral device information from the printing device at a given time interval,
the notification information generation unit generates notification information indicating a change of the progress state of the print job in units of pages based on first peripheral device information indicating the progress state of the print job in units of pages at a certain time and second peripheral device information indicating that the print job has been canceled at a later time.

* * * * *